US008999606B2

(12) United States Patent
Iijima et al.

(10) Patent No.: US 8,999,606 B2
(45) Date of Patent: Apr. 7, 2015

(54) SOLID POLYMER TYPE FUEL CELL CATALYST, SOLID POLYMER TYPE FUEL CELL ELECTRODE, AND FUEL CELL

(75) Inventors: Takashi Iijima, Tokyo (JP); Kenichiro Tadokoro, Tokyo (JP); Hideaki Sawada, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 717 days.

(21) Appl. No.: 12/998,441

(22) PCT Filed: Oct. 22, 2009

(86) PCT No.: PCT/JP2009/068542
§ 371 (c)(1),
(2), (4) Date: Apr. 19, 2011

(87) PCT Pub. No.: WO2010/047415
PCT Pub. Date: Apr. 29, 2010

(65) Prior Publication Data
US 2011/0195339 A1    Aug. 11, 2011

(30) Foreign Application Priority Data

Oct. 22, 2008  (JP) ................................ 2008-272153
Oct. 22, 2008  (JP) ................................ 2008-272230
Jan. 26, 2009  (JP) ................................ 2009-014744

(51) Int. Cl.
*H01M 4/96*     (2006.01)
*H01M 4/90*     (2006.01)
*H01M 4/36*     (2006.01)
*H01M 4/02*     (2006.01)
(Continued)

(52) U.S. Cl.
CPC .... *H01M 4/8605* (2013.01); *H01M 2008/1095* (2013.01); *H01M 2004/8689* (2013.01); *H01M 4/8652* (2013.01); *Y02E 60/50* (2013.01); *H01M 4/8673* (2013.01); *H01M 4/926* (2013.01); *H01M 8/04119* (2013.01)

(58) Field of Classification Search
None
See application file for complete search history.

(56) References Cited

U.S. PATENT DOCUMENTS 6,713,020 B2 *   3/2004  Kato et al. ..................... 422/98
2007/0224479 A1 *   9/2007  Tadokoro et al. ............... 429/30

FOREIGN PATENT DOCUMENTS

CA    2563932    11/1995
CN    1947289    4/2007
(Continued)

OTHER PUBLICATIONS

International Search Report dated Dec. 15, 2009 issued in corresponding PCT Application No. PCT/JP2009/068542.
(Continued)

*Primary Examiner* — Kwang Han
(74) *Attorney, Agent, or Firm* — Kenyon & Kenyon LLP

(57) ABSTRACT

The present invention has as its object the provision of a solid polymer fuel cell catalyst exhibiting high durability and high power generation performance regardless of the humidification conditions or load conditions.

The present invention relates to a solid polymer type fuel cell catalyst which is comprised of a carbon material which carries a catalyst ingredient, wherein the amount of adsorption of water vapor ($V_{10}$) at 25° C. and a relative humidity of 10% of the carbon material is 2 ml/g or less and the amount of adsorption of water vapor ($V_{90}$) at 25° C. and a relative humidity of 90% of the carbon material is 400 ml/g or more.

12 Claims, 2 Drawing Sheets

(51) Int. Cl.
  *H01M 4/86* (2006.01)
  *H01M 4/92* (2006.01)
  *H01M 8/04* (2006.01)
  *H01M 8/10* (2006.01)

(56) References Cited

FOREIGN PATENT DOCUMENTS

| | | |
|---|---|---|
| JP | 2004-071253 | 3/2004 |
| JP | 2004-342505 | 12/2004 |
| JP | 2005-174835 | 6/2005 |
| JP | 2006-59634 | 3/2006 |
| JP | 2006-059634 | 3/2006 |
| JP | 2006-134629 | 5/2006 |
| JP | 2006-155921 | 6/2006 |
| JP | 2006-156154 | 6/2006 |
| JP | 2006-310201 | 11/2006 |
| JP | 2006-318707 | 11/2006 |
| JP | 2007-220414 | 8/2007 |
| JP | 2007-273145 | 10/2007 |
| JP | 2008-041253 | 2/2008 |
| JP | 2008-159519 | 7/2008 |
| JP | 2008-210580 | 9/2008 |

OTHER PUBLICATIONS

Canadian Office Action, dated Jul. 25, 2012, issued in corresponding Canadian Application No. 2739306.
European Search Report dated Aug. 1, 2014 issued in corresponding European Application No. 09 82 2108.

* cited by examiner

SOLID POLYMER TYPE FUEL CELL CATALYST, SOLID POLYMER TYPE FUEL CELL ELECTRODE, AND FUEL CELL

This application is a national stage application of International Application No. PCT/JP2009/068542, filed 22 Oct. 2009, which claims priority to Japanese Application Nos. 2008-272230, filed 22 Oct. 2008; 2008-272153, filed 22 Oct. 2008; and 2009-014744, filed 26 Jan. 2009 each of which is incorporated by reference in its entirety.

TECHNICAL FIELD

The present invention relates to a solid polymer type fuel cell catalyst, a solid polymer type Fuel Cell Electrode using the same, and a fuel cell having the same. In particular, it relates to a solid polymer type fuel cell catalyst exhibiting a high performance even when limitations of the usage environment make it impossible for the catalyst layer to be sufficiently humidified and when fluctuations in the operating conditions temporarily force low humidification operation, an electrode using the same, and a fuel cell having the same.

BACKGROUND ART

Solid polymer type fuel cells have been developed as clean power sources using hydrogen as fuel and as drive sources for electric vehicle and further stationary power sources for both generating power and supplying heat. Further, solid polymer type fuel cells feature a higher energy density compared with lithium ion batteries and other secondary cells. They are being developed as power sources for portable computers or mobile communication devices where high energy density is demanded.

A typical unit cell of a solid polymer type fuel cell is basically comprised of an anode (fuel electrode), a cathode (air electrode), and a proton conductive solid polymer electrolytic membrane arranged between the two electrodes. The anode and cathode are usually thin film electrodes comprised of a catalyst of platinum or another precious metal which is carried on a carrier carbon material, a fluororesin powder or other pore former, a solid polymer electrolyte, etc.

A solid polymer type fuel cell, as explained above, is a high energy density power source, but further improvement is being sought in the output per unit electrode area. For this reason, one of the most effective means for solution is to improve the catalyst activity of the electrochemical reactions occurring at the electrode catalysts forming the anode and cathode. In an anode using hydrogen as fuel, the catalytic activity of an electrochemical reaction where hydrogen molecules are oxidized to hydrogen cations (protons) is improved. On the other hand, in a cathode, the catalytic activity of an electrochemical reaction where protons from the solid polymer electrolyte react with oxygen whereby the oxygen is reduced to water is improved. For the electrode catalysts of the anode and cathode of such a solid polymer type fuel cell, platinum or another precious metal can be used. However, a precious metal is expensive, so to speed-commercialization and popularization of solid polymer type fuel cells, the amount of use per electrode unit area has to be reduced. For this reason, the catalyst activity has to be further improved.

Furthermore, when used as a fuel cell, it is known that starting and stopping or high load operation causes the catalyst ingredient platinum or other metal to be eluted or the carbon materials used for the carriers etc. to be corroded. For this reason, art for inhibiting elution of the platinum or other metal or corrosion of carbon is also extremely important.

As a measure for inhibiting corrosion of the carbon material which is used as a catalyst carrier, up until now, the following art has been disclosed. For example, PLT 1 discloses to use as the catalyst carrier a carbon material which is heat treated etc. to adjust the relative intensity ratio ($I_D/I_G$) of the peak intensity ($I_D$) in the range of 1300 to 1400 $cm^{-1}$ called the D-band and the peak intensity ($I_G$) in the range of 1500 to 1600 $cm^{-1}$ called the G-band, obtained from the Raman spectra, to 0.9 to 1.2.

PLT 2 discloses an electrode structure of a solid polymer type fuel which is high in power generation performance, high in potential durability, and excellent in durability against insufficient fuel by making the specific surface area of the carbon material which is used as the catalyst carrier 800 $m^2/g$ to 900 $m^2/g$.

The basic structure of the solid polymer type fuel cell according to the present invention is that of a proton conductive electrolytic membrane sandwiched between an anode and cathode formed by catalyst layers which are in turn sandwiched at the outside by gas diffusion layers and at the further outsides by separators. These form a unit cell of a fuel cell. Usually, such unit cells of fuel cells are used stacked in accordance with the required output.

To take out current from this basic structure of fuel cell, oxygen or air or another oxidizing gas is supplied to the cathode side and hydrogen or another reducing gas is supplied to the anode side from the gas channels of the separators arranged at the two electrodes of the anode and cathode through the gas diffusion layers to the catalyst layers. For example, when utilizing hydrogen gas and oxygen gas, the energy difference (potential difference) of the chemical reaction of $H_2 \rightarrow 2H^+ + 2e^-$ ($E_0=0V$) occurring on the catalyst of the anode and the chemical reaction of $O_2 + 4H^+ + 4e^- \rightarrow 2H_2O$ ($E_0=1.23V$) occurring on the catalyst of the cathode is utilized to take out the current.

Therefore, unless the gas diffusion paths from the gas channels of the separators to the catalysts inside the catalyst layers over which the oxygen gas or hydrogen gas can move, the proton conduction paths over which protons ($H^+$) generated on the anode catalyst can pass through the proton conductive electrolytic membrane to reach the catalyst of the cathode, and the electron conduction paths over which electrons ($e^-$) generated on the anode catalyst can pass through the gas diffusion layers, separators, and external circuits to the cathode catalyst are continuously connected without being severed, it is not possible to efficiently take out the current.

Inside the catalyst layers, in general, it is important that the pores forming the gas diffusion paths formed in the interstices of the material, the electrolytic material forming the proton conduction paths, and the carbon material, metal material, or other conductive material forming the electron conduction paths respectively form connected networks.

Further, at the proton conduction paths in the proton conductive electrolytic membrane or catalyst layers, an exchange resin such as a perfluorosulfonic acid polymer is used as a polymer electrolytic material. The generally used polymer electrolytic material first exhibits a high proton conductivity in a wet environment, but ends up falling in proton conductivity in a dry environment. Therefore, to make a fuel cell operate efficiently, the polymer electrolytic material has to be kept in a sufficiently wet state at all times.

As one source of supply of the water for making the polymer electrolytic material a sufficiently wet state, there is the water generated by power generation at the cathode. However, the amount of generation of this water depends on the load conditions (current density). That is, at the time of stopping power generation or the time of low load operation, the amount of water which is generated is small, so the polymer electrolytic material dries out and the proton conductivity easily falls. On the other hand, at the time of high load operation, the amount of water which is generated is large, so the excessive water which the polymer electrolytic material cannot absorb easily blocks the pores forming the gas diffusion paths.

For a stable source of supply of water not dependent on the load conditions, a humidifier is generally used. The method of running the supplied gas through water warmed in advance to a certain temperature for humidification or the method of supplying water warmed to a certain temperature directly to the cell is used. However, to raise the energy efficiency of the system as a whole, it is preferable that no humidifier, which constantly consumes energy for holding the warmth, be provided. Even if there is one, consumption of the minimum necessary limit of energy is preferable. Further, to make the system as a whole lighter and small, no humidifier is preferable. Even if there is one, the minimum necessary limit of size is preferable.

Therefore, depending on the purpose of use of the fuel cell, sometimes it is not possible to mount a humidifier of a sufficient capacity on the system and not possible to sufficiently humidify the electrolytic material. Further, even when a humidifier provided with a sufficient humidification ability for steady state operation is mounted, the system will unavoidably temporarily fall into a low humidification state at the time of startup or at the time of load fluctuation.

In this way, the electrolytic material cannot necessarily be used in a suitable wet environment at all times, so there is a strong demand for a fuel cell catalyst layer which can exhibit a high performance under all sorts of load conditions or humidification conditions. A high performance fuel cell which is provided with such catalyst layers and therefore becomes easy to control and operate is also desired.

For the purpose of mainly avoiding drying out of the polymer electrolytic material, in the past the method has been proposed of using an ingredient having hydrophilicity for the gas diffusion layers or catalyst layers or the intermediate layers arranged between the gas diffusion layers and catalyst layers so as to maintain the wet state of the electrolytic membrane or the electrolytic material inside of the catalyst layers.

PLT 3 discloses, as a proposal for imparting hydrophilicity to the catalyst layers, to include zeolite, titania, or other hydrophilic particles or hydrophilic carrier in the anode so as to maintain a high cell performance even when lowering the amount of humidification.

PLT 4 discloses a fuel cell exhibiting superior startup characteristics even in a low temperature atmosphere wherein the catalyst layer of the anode contains a moisture retaining agent and wherein the moisture retaining agent is made a conductive material treated to make it hydrophilic (hydrophilic carbon black etc.)

PLT 5 discloses to provide a fuel cell-able to handle a broad range of humidification conditions by including, in the catalyst layers, hydrophilic particles carrying hydrophobic, particles such as silica particles carrying Teflon® particles.

PLT 6 proposes a fuel cell characterized by using activated carbon as the catalyst carrier, having a surface area $S_{BET}$ of the activated carbon according to the BET method (Brunauer Emmett Teller specific surface area method) satisfying $S_{BET} \geq 1500$ m$^2$/g, and having a ratio of the 2 nm or less size micropore surface area $S_{micro}$ (m$^2$/g) to the total pore area $S_{total}$ (m$^2$/g) satisfying $S_{micro}/S_{total} \geq 0.5$.

PLT 7 proposes a fuel cell using a carrier partially containing mesoporous carbon particles as the catalyst carrier.

CITATION LIST

Patent Literature

PLT 1: Japanese Patent Publication (A) No. 2008-41253
PLT 2: Japanese Patent Publication (A) No. 200.6-318707
PLT 3: Japanese Patent Publication (A) No. 2004-342505
PLT 4: Japanese Patent Publication (A) No. 2006-59634
PLT 5: Japanese Patent Publication (A) No. 2005-174835
PLT 6: Japanese Patent Publication (A) No. 2006-155921
PLT 7: Japanese Patent Publication (A) No. 2004-71253
PLT 8: Japanese Patent Publication (A) No. 2006-134629

SUMMARY OF INVENTION

Technical Problem

As explained above, as measures for inhibiting corrosion of the carbon material which is used as a catalyst carrier, as shown in PLTs 1 and 2, control of the graphitization or surface area of the carbon material etc. may be mentioned. However, if raising the graphitization or reducing the specific surface area, there is no question that the resistance to oxidation loss is improved, but even if the graphitization or specific surface area is of the same extent, there are materials where the resistance to oxidation loss is high and materials where it is low. To obtain a carbon material with a truly high resistance to oxidation loss, it was necessary to clarify what this was due to. Further, if raising the graphitization or reducing the specific surface area, not only does the dispersion of the catalyst particles fall, but also the moisture retention falls and as a result the fuel cell performance falls.

The methods disclosed in PLT 3 and PLT 5 introduce a material which is hydrophilic, but does not have conductivity or proton conductivity into the catalyst layer, so have the problem of ending up severing the paths of conduction of electrons or protons and increasing the internal resistance.

PLT 4 uses carbon black treated by sulfuric acid, as an example of the conductive material treated to make it hydrophilic, as the catalyst carrier, but does not describe or suggest the extent of hydrophilicity (extent of hydrophilic treatment). According to studies of the inventors, it became clear that the problem arises that with just inclusion of carbon black which is treated to make it hydrophilic, while a superior moisture retention ability will be exhibited under low moisture conditions, at the time of high load operation or when sufficiently humidified, the gas diffusion paths will be blocked by the condensed water. That is, it became clear that depending on the extent of the hydrophilicity, the moisture retention ability will become insufficient or the moisture retention ability will become too strong and, with sufficient humidification, the gas diffusion paths will be blocked by water.

Further, previously, the inventors developed a fuel cell which has fuel cell catalyst layers in which the main ingredient of the catalyst layers, that is, the carbon material included in the catalyst layers, is divided into a carbon material which carries a catalyst ingredient (below, "catalyst-carrying carbon material") and a carbon material which does not carry a catalyst ingredient (below, "gas-diffusing carbon material") and in which at least two types of carbon materials with different hydrations (hydration forces) are used for the gas-diffusing carbon material so as to maintain the electrolytic material in the catalyst layer in a suitable wet state at all times under low humidification conditions and to prevent the gas diffusion paths from being blocked by condensed water under high humidification conditions. Due to this, it became possible to obtain a high performance regardless of the humidification conditions.

However, while this fuel cell is extremely effective in high load operation and low load operation under high humidification conditions and low humidification conditions and can exhibit high performance under all sorts of conditions, the gas-diffusing carbon material which carries the catalyst retains water, so the water retention effect of the electrolytic material near the catalyst is not necessarily sufficient. New improvements have been necessary for exhibiting higher characteristics.

In this regard, the proposal of PLT 6 for using activated carbon as the carrier, by which water retention of the catalyst carrier can be expected, is sufficient in the point of the water retention near the catalyst particles. It can be said that movement of the gas is also secured due to the gas-diffusing carbon material. However, if aiming at a high performance fuel cell, there were the problems that activated carbon itself is low in electron conductivity, the hydrophilicity around the catalyst particles is too high and movement of the gas very near the catalyst is inhibited, etc.

The proposal of PLT 7 for making mesoporous carbon a part of the catalyst carrier catalyst carrier mixes this with a carbon material other than mesoporous carbon so as to improve the gas diffusion and electron conduction compared with the time of use of mesoporous carbon alone, but, for example, at the time of high load operation under high humidification conditions, there is a strong tendency for the water produced to block the gas. If lowering the ratio of the mesoporous carbon to avoid this, in particular at the time of load operation under low humidification conditions, the electrolyte near the catalyst on the carbon material other than the mesoporous carbon easily dries out. At a certain specific mixing ratio, superior characteristics can only be exhibited under limited conditions. In particular, the carbon material other than mesoporous carbon can be expected to function to strengthen the diffusion of the reaction gases, but the carbon material other than mesoporous carbon also has catalyst particles, so in particular with use at the cathode at the time of high load operation, the water produced at the catalyst particles tends to block the gas diffusion. This could not be used as a catalyst layer universal for all sorts of conditions.

PLT 8 proposes, at the anode electrode, an electrode structure containing primary catalyst carrier particles with a low water adsorption at the catalyst layer and secondary catalyst carrier particles with a high water adsorption at the water decomposition layer. However, the layer containing the primary catalyst carrier particles of the low water adsorption carbon cannot be replenished with moisture from the catalyst-carrying carbon under low humidification conditions, so the cell cannot function. Further, the secondary catalyst carrier particles of the high water adsorption carbon of the water decomposition layer only boasts a large amount of water adsorption, so while the performance at the time of low humidification may be high, generally the durability becomes lower.

Therefore, the present invention, in consideration of the above problem, has as its object to provide a catalyst which has a high resistance to oxidation loss and is able to exhibit a high cell performance and a fuel cell which has a fuel cell catalyst layer which forms a path for movement of the gases, electrons, and protons in the catalyst layers using the same without being severed and which maintains the electrolytic material in the catalyst layers at a suitable wet state at all times at the time of low humidification conditions or low load operation while preventing the gas diffusion paths from being blocked by condensed water even at the time of high humidification conditions or high load operation, that is, a fuel cell which exhibits a high performance regardless of the humidification conditions.

Solution to Problem

The inventors worked to solve the problem of the development of a catalyst with a high resistance to oxidation loss and able to exhibit a high cell performance by an intensive examination of the properties of the catalyst-carrying carbon material which carries the catalyst such as the graphitization, oxygen concentration, specific surface area, amount of adsorption of water vapor, etc., whereupon they discovered that the amount of adsorption of water vapor matches the trends in the resistance to oxidation loss and cell performance, discovered a catalyst comprised of a catalyst-carrying carbon material defined using the amount of adsorption of water vapor as a parameter, and thereby completed the present invention.

That is, the catalyst of the present invention and the solid polymer type fuel cell electrode and fuel cell containing it have the following as their gists:

(1) A solid polymer type fuel cell catalyst which is comprised of a carbon material which carries a catalyst ingredient which has an oxygen reducing activity, the catalyst characterized in that the carbon material has an amount of adsorption of water vapor ($V_{10}$) at 25° C. and a relative humidity of 10% of 2 ml/g or less and in that the carbon material has an amount of adsorption of water vapor ($V_{90}$) at 25° C. and a relative humidity of 90% of 400 ml/g or more.

(2) A solid polymer type fuel cell catalyst as set forth in (1), characterized in that the carbon material has a ratio $V_{10}/V_{90}$ of an amount of adsorption of water vapor ($V_{10}$) at 25° C. and a relative humidity of 10% and an amount of adsorption of water vapor ($V_{90}$) at 25° C. and a relative humidity of 90% of 0.002 or less.

(3) A solid polymer type fuel cell electrode characterized by including a catalyst as set forth in (1) or (2).

(4) A fuel cell characterized by including a catalyst as set forth in (1) or (2) in a catalyst layer of one or both of a pair of catalyst layers which sandwich a proton conductive electrolytic membrane.

Furthermore, the inventors engaged in in-depth studies to solve the problem of improvement of the characteristics of fuel cells, that is, use of a catalyst layer using the present catalyst to obtain high cell performance regardless of the humidification conditions. That is, they took note of the water retention ability of the catalyst layers used for a fuel cell, studied the material characteristics and higher order structures of catalyst ingredients, electrolytic materials, and carbon materials, and designed a catalyst layer structure wherein the catalyst carried on the catalyst carrier sufficiently functions under all sorts of conditions. As a result, they succeeded in achieving higher functions by dividing the ingredients of the catalyst layers to a catalyst-carrying carbon material which carries a catalyst ingredient, a gas-diffusing carbon material which does not carry a catalyst ingredient, and a conductivity aid carbon material which does not carry a catalyst ingredient, furthermore dividing the catalyst-carrying carbon material into at least two types of a catalyst according to the above (1) and (2) (below, the "present catalyst"), that is, a catalyst-carrying carbon material A, and a catalyst other than the catalyst-carrying carbon material A, that is, a catalyst-carrying carbon material B, and combining these complexly.

That is, the inventors discovered that if using at least two types of catalyst-carrying carbon materials of the catalyst-carrying carbon material A which has a high water retention ability and can easily store the water produced by the power generation or the water which is supplied due to humidification and the catalyst-carrying carbon material B which has the property of superior electron conductivity and easy gas diffusion, it is possible to realize the superior function of exhibiting high performance regardless of the humidification conditions and load conditions.

The inventors intensively studied the optimal structure for the catalyst-carrying carbon material B and as a result discovered that by selecting a highly developed structure carbon material and providing this together with the catalyst-carrying carbon material A in the catalyst layers, it is possible to effectively suppress blocking of the gas diffusion paths by water in particular under high humidification conditions or at the time of high load operation. Further, they discovered that if also giving the characteristic of a superior electron conductivity to the catalyst-carrying carbon material B for the purpose of supplementing the electron conductivity of the catalyst-carrying carbon material A having the porous structure enabling easy water retention, the rise of the internal resistance due to the electron conductivity can be prevented.

Furthermore, they discovered that by making the structure one having two aggregation phases a catalyst aggregation phase which is formed by aggregation of the catalyst ingredient in the catalyst layer, the two types of catalyst-carrying carbon materials, and an electrolytic material and a gas-diffusing carbon material aggregation phase which is formed by aggregation of the gas-diffusing carbon material and by making the structure one using the catalyst aggregation phase as a continuous phase and dispersing the gas-diffusing carbon material aggregation layer phase inside it, it is possible to realize the superior function of exhibiting a high performance regardless of the humidification conditions or load conditions.

By structuring the catalyst layer in this way, the electrolytic material is present near the catalyst carbon material. This prevents the drop in water content under dry conditions. By making the electrolytic material a continuous phase, it becomes possible to further develop the proton conduction paths, that is, the network of the electrolytic material, and prevent a rise in the internal resistance due to the proton conductivity. Further, by arranging the catalyst-carrying carbon material B which has the properties of electron conductivity and a highly developed structure near the catalyst-carrying carbon material A, at the time of high humidification conditions or high load operation, it is possible to make the catalyst on the catalyst-carrying carbon material B work while securing the gas diffusion paths near the catalyst-carrying carbon material A and thereby prevent a drop in the power generation performance. Further, at the time of low humidification conditions or low load operation, it is possible to use the water stored by the high water retaining catalyst-carrying carbon material A to humidify the nearby electrolytic material, make the catalyst on the catalyst-carrying carbon materials A and B effectively act, and use the catalyst-carrying carbon material B to assist the necessary transfer of electrons at the catalyst and prevent the rise in internal resistance due to the transfer of electrons.

Furthermore, as explained above, by dispersing the gas-diffusing carbon material aggregation phase in the continuous phase of the catalyst aggregation phase, it becomes possible to secure the gas diffusion paths. The gas-diffusing carbon material aggregation phase does not have any catalyst ingredient, so at the time of power generation, no water is produced in the gas diffusion material aggregation phase. Accordingly, it is possible to secure the gas diffusion paths more effectively. Further, the gas-diffusing carbon material aggregation phase uses a fluorine compound which does not have electron conductivity etc., so the gas diffusion paths can be secured without the electron conduction paths being severed. Further, the gas-diffusing carbon material aggregation phase is an independent aggregation phase which does not contain an electrolyte substance or catalyst ingredient, so by using a carbon material which has a low water vapor adsorption characteristic for the gas-diffusing carbon material which forms the aggregation phase, it is possible to make use of the water repellency originally held by the carbon material surface, so it is possible to effectively secure the gas diffusion paths.

On the other hand, the inventors discovered that even with a catalyst layer having an at least two-layer structure arranging a catalyst layer mainly comprised of a high water retaining catalyst-carrying carbon material A as the inner layer at the electrolytic membrane side and arranging an outer layer mainly comprised of a highly developed structure catalyst-carrying carbon material B at the opposite side from the electrolytic membrane across this inner layer, it is possible to realize the superior function of exhibiting a high performance regardless of the humidification conditions or load conditions.

By structuring the catalyst layer in this way, at the time of high humidification conditions or high load operation, the outer layer with gas diffusion paths resistant to blocking by water mainly functions and the supplied water and produced water are stored in the inner layer, while at the time of low humidification conditions or low load conditions, the water stored by the inner layer is used to prevent drying of the electrolytic material and a drop in the power generation performance can be suppressed.

In the above way, the inventors discovered that by selecting a plurality of carbon materials for use in the catalyst layers according to the functions sought from the catalyst layers and furthermore controlling the aggregation phase structure and the layer structures so that the selected carbon material and the catalyst ingredient and electrolytic material respectively efficiently act, it is possible to obtain a fuel cell which can generate power stably and efficiently under a range of conditions broader than ever before and thereby completed the present invention.

Therefore, the optimum catalyst layer structure including the catalyst of the present invention has as its gist the following:

(5) A fuel cell which includes a pair of catalyst layers sandwiching a proton conductive electrolytic membrane, the cell characterized in that
at least the catalyst layer of the cathode includes a catalyst ingredient, electrolytic material, and carbon material,
the carbon material includes at least two types of a catalyst-carrying carbon material which carries the catalyst ingredient and a gas-diffusing carbon material which does not carry the catalyst ingredient, and
the catalyst-carrying carbon material includes at least two types of the catalyst-carrying carbon material A and catalyst-carrying, carbon material B,
the catalyst-carrying carbon material A is a solid polymer type fuel cell catalyst as described in (1) or (2), and
the catalyst-carrying carbon material B has a ratio $X/S_{BET}$ of the DBP oil absorption X ml/100 g and specific surface area $S_{BET}$ by the BET method of 0.2 to 3.0.

(6) A fuel cell including a pair of catalyst layers sandwiching a proton conductive electrolytic membrane, in which fuel cell at least the catalyst layer of the cathode includes a catalyst ingredient, electrolytic material, and carbon material, the carbon material includes at least two types of the catalyst-carrying carbon material which carries a catalyst ingredient and the gas-diffusing carbon material which does not carry a catalyst ingredient, the catalyst-carrying carbon material includes at least two types of the catalyst-carrying carbon material A and catalyst-carrying carbon material B, the catalyst-carrying carbon material A is a solid polymer type fuel cell catalyst as described in the (1) or the (2), the catalyst-carrying carbon material B has a ratio $X/S_{BET}$ of the DBP oil absorption X ml/100 g and specific surface area $S_{BET}$ by the BET method of 0.2 to 3.0, and furthermore the catalyst layer of the cathode is comprised of a two-phase mixed structure comprised of a catalyst aggregation phase comprised of ingredients comprised of the catalyst-carrying carbon material and the electrolytic material aggregated together and a gas-diffusing carbon material aggregation phase comprised of the gas-diffusing carbon material aggregated together.

(7) A fuel cell including a pair of catalyst layers sandwiching a proton conductive electrolytic membrane, in which fuel cell at least the catalyst layer of the cathode includes a catalyst ingredient, electrolytic material, and carbon material, the carbon material includes at least three types of a catalyst-carrying carbon material which carries the catalyst ingredient, a conductivity aid carbon material which does not carry the catalyst ingredient, and a gas-diffusing carbon material which does not carry the catalyst ingredient, the catalyst-carrying carbon material includes at least two types of a catalyst-carrying carbon material A and a catalyst-carrying carbon material B, the catalyst-carrying carbon material A is a solid polymer type fuel cell catalyst as described in the (1) or the (2), the catalyst-carrying carbon material B has a ratio $X/S_{BET}$ of a DBP oil absorption X ml/100 g and a specific surface area $S_{BET}$ evaluated by BET of 0.2 to 3.0, and furthermore the catalyst layer of the cathode has a structure which contains at least two layers of an inner layer on a side contiguous with the proton conductive electrolytic membrane and an outer layer on a side not contiguous with the proton conductive electrolytic membrane, the inner layer is comprised of an at least two-phase mixed structure of a catalyst aggregation phase A comprised of ingredients comprised of the catalyst-carrying carbon material A, the conductivity aid carbon material, and the electrolytic material agglomerated together and a gas-diffusing carbon material aggregation phase comprised of at least ingredients comprised of the gas-diffusing carbon material agglomerated together, and the outer layer is comprised of an at least two-phase mixed structure of a catalyst aggregation phase B comprised of at least ingredients comprised of the catalyst-carrying carbon material B and the electrolytic material and a gas-diffusing carbon material aggregation phase comprised of at least ingredients comprised of the gas-diffusing carbon material agglomerated together, and the inner layer and the outer layer are structures wherein, in their layers, the catalyst aggregation phase A and the catalyst aggregation phase B are continuous and the gas-diffusing carbon material aggregation phase is dispersed in the catalyst aggregation phase A or B.

Note that, the inner layer may include a layer comprising at least the catalyst-carrying carbon material A, the conductivity aid carbon material, the electrolytic material, and the gas-diffusing carbon material, and the outer layer may include a layer comprising at least the catalyst-carrying carbon material B, the electrolytic material, and the gas-diffusing carbon material.

(8) A fuel cell as set forth in (6) or (7) characterized in that the catalyst-carrying carbon material A further has a specific surface area $S_{BET}$ evaluated by BET of 1000 m$^2$/g to 4000 m$^2$/g and has a ratio $S_{micro}/S_{total}$ of the micropore surface area $S_{micro}$ of the diameter 2 nm or less by t-plot analysis and the total surface area $S_{total}$ of 0.5 or more.

(9) A fuel cell as set forth in any one of (5) to (8) characterized in that a mass ratio A/(A+B) of the catalyst-carrying carbon, material A and the catalyst-carrying carbon material B in the inner layer is 0.2 to 0.95.

(10) A fuel cell as set forth in (7) characterized in that a mass ratio Y/(A+Y) of the conductivity aid carbon material Y and the catalyst-carrying carbon material A in the inner layer is 0.05 to 0.4.

(11) A fuel cell as set forth in (7) characterized in that the conductivity aid carbon material in the inner layer has a ratio $X/S_{BET}$ of its DBP oil absorption X ml/100 g and a specific surface area $S_{BET}$ evaluated by BET of 0.2 to 3.0.

(12) A fuel cell as set forth in (7) characterized in that a content of the gas-diffusing carbon material in the inner layer is 3 mass % to 30 mass %.

(13) A fuel cell as set forth in (7) characterized in that a content of the gas-diffusing carbon material in the outer layer is 3 mass % to 30 mass %.

(14) A fuel cell as set forth in (7) characterized in that an electron conductivity of the conductivity aid carbon material in the inner layer is at least an electron conductivity of the catalyst-carrying carbon material A in the inner layer.

Advantageous Effects of Invention

The present catalyst and a fuel cell having a catalyst layer containing this catalyst as an electrode have a high resistance to oxidation loss of the catalyst carrier and other aspects of durability. Together with the effect of suppression of desorption of the catalyst metal ingredient from the carrier, it becomes possible to improve the durability of the catalyst itself in various environments. At the same time, the moisture retention ability of the carrier itself of the present invention is high, so at the time of low humidification operation or other operating states where the moisture content of a catalyst layer falls, it becomes possible to suppress a drop in the proton conductivity due to the moisture released from the catalyst and the output characteristics of the low humidification conditions can be improved.

Furthermore, by using the catalyst layer structure of the present invention in the catalyst layer which contains this catalyst, it is possible to form paths of movement of the gases, electrons, and protons without severance. Under low humidification conditions or low load conditions, it is possible to maintain the electrolytic material in the catalyst layer in a suitable wet state at all times while under high humidification conditions or high load conditions, it is possible to prevent the gas diffusion paths from being blocked by the condensed water and provide a fuel cell which exhibits a high output performance regardless of the humidification conditions or load conditions. Therefore, the catalyst and the fuel cell system having the catalyst layer structure according to the present invention are high in durability and can exhibit high output performance in various operating environments.

BEST MODE FOR CARRYING OUT INVENTION

Figure 1:
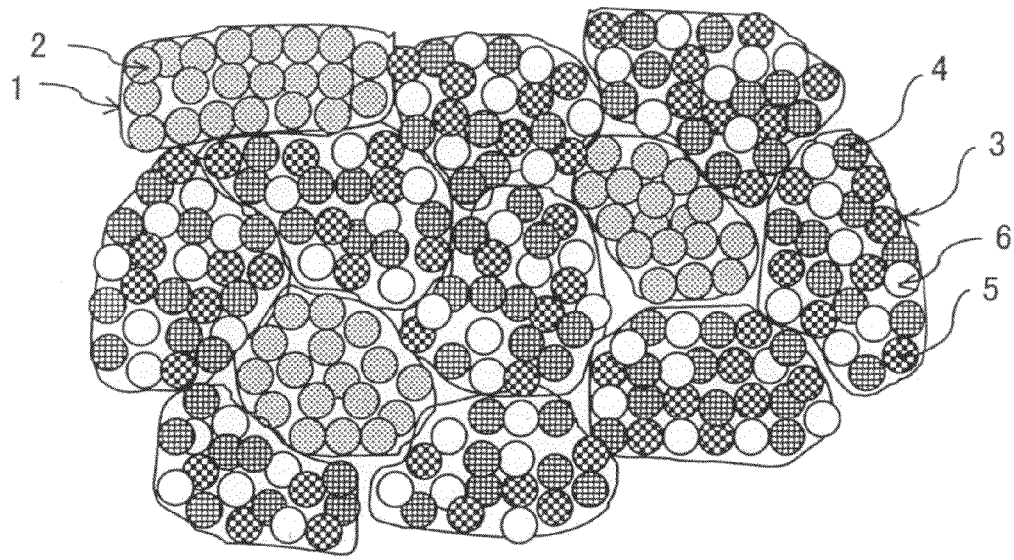
FIG. 1 is a schematic view of the aggregation phase structure of the catalyst layer defined by claim 4 of the present invention. (The relative sizes of the layer structures are different from the actual sizes.)
Figure 2:
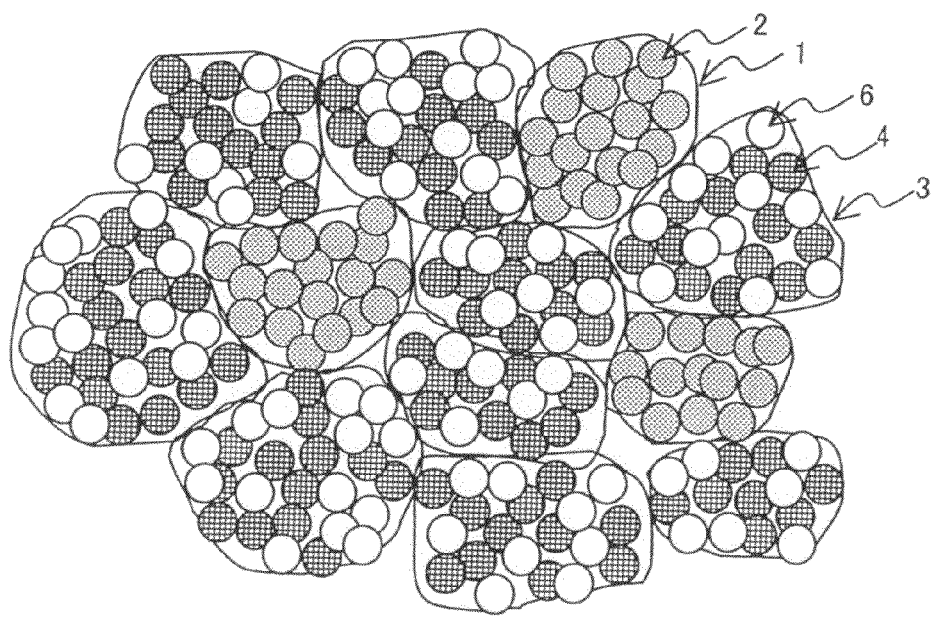
FIG. 2 is a schematic view of the aggregation phase structure of the inner layer catalyst layer of the present invention. (The relative sizes of the layer structures are different from the actual sizes.)
Figure 3:
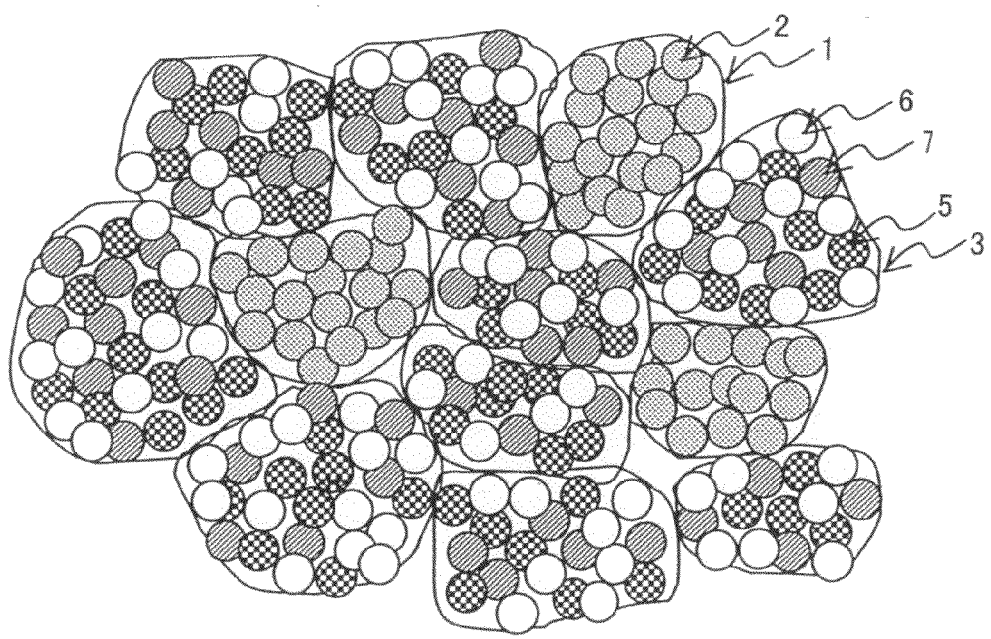
FIG. 3 is a schematic view of the aggregation phase structure of the outer layer catalyst layer of the present invention. (The relative sizes of the layer structures are different from the actual sizes.)

The catalyst for a solid polymer type fuel cell according to the present invention (the present catalyst) defines the amount of adsorption of water vapor of the carbon material which can be used as the catalyst carrier by the amount of adsorption of water vapor ($V_{10}$) at 25° C. and a relative humidity of 10% and the amount of adsorption of water vapor ($V_{90}$) at 25° C. and a relative humidity of 90%.

It is known that at the time of startup or stopping of a fuel cell etc., if the anode (fuel electrode) has locations which are partially deficient in hydrogen due to the presence of air etc., the potential of the cathode (air electrode) will rise and the catalyst carrier, that is, the carbon material, will suffer oxidation loss. However, if the carbon material which can be used as the catalyst carrier has an amount of adsorption of water vapor at 25° C. and a relative humidity of 10% of 2 ml/g or less, the oxidation loss is suppressed and a catalyst excellent in resistance to oxidation loss can be obtained. If the carbon material which can be used as the catalyst carrier has an amount of adsorption of water vapor at 25° C. and a relative humidity of 10% of over 2 ml/g, remarkable oxidation loss occurs, the hydrophilicity of the catalyst carrier rises too much, the drainage ability falls, the fuel cell performance falls, the catalyst which was carried drops off or is dissolved away along with the oxidation loss, the amount of catalyst is reduced; and the fuel cell performance falls. Therefore, more preferably there is an extra margin of about 10%. 1.8 ml/g or less is more preferable.

The amount of adsorption of water vapor at a low relative humidity of a relative humidity of about 10% is considered to be dependent on not the aggregate of the carbon material or other aggregation structure or porous structure, but on the type of functional groups forming the carbon material surface and the density of the same. If the amount of adsorption of water vapor at a relative humidity of 10% of the present invention is 2 ml/g or less, the absolute amount of the functional groups of the carbon material surface is small, therefore it is believed that the oxidation loss due to the oxidation and decomposition of the functional groups is suppressed.

The carbon material which can be used as the catalyst carrier should have an amount of adsorption of water vapor at 25° C. and a relative humidity of 90% which is as small as possible if considering only the resistance to oxidation loss, but the dispersion at the time of carrying a catalyst is believed to conversely rise due to the presence of functional groups, so a lower limit of 0.05 ml/g or more is preferable.

If the carbon material which can be used as the catalyst carrier has an amount of adsorption of water vapor at 25° C. and a relative humidity of 90% of 400 ml/g or more, the electrolyte which is near the catalyst ingredient can be held in a suitable wet state and a drop in the proton conductivity can be prevented, so even when a need arises for operation under a low humidification such as in an automobile-use fuel cell, the drop in the fuel cell performance can be kept to the minimum extent. More preferably, there should be a 10% or more leeway. 440 ml/g or more is preferable.

If the carbon material which can be used as the catalyst carrier has too high an amount of adsorption of water vapor at 25° C. and a relative/humidity of 90%, the water produced at the time of a high load operation will drain slowly and the fuel cell performance will fall, so the upper limit is preferably made 2000 ml/g or less. More preferably it is 1200 ml/g or less. The dominant factor in the amount of adsorption of water vapor at a relative humidity of 90% is believed to be the porous structure of the carbon material surface. That is, since the amount of adsorption of water vapor at a relative humidity of 90% of the present invention is 400 ml/g or more, it is deduced that there are considerable pores at the carbon material surface.

In the present invention, having a high value of the amount of adsorption of water vapor ($V_{90}$) at 25° C. and a relative humidity of 90%, a parameter corresponding to the moisture retention ability of the catalyst, and simultaneously having a small value of the amount of adsorption of water vapor ($V_{10}$) at 25° C. and a relative humidity of 10%, a parameter corresponding to a high resistance to oxidation loss of the catalyst-carrying carbon material, is essential for achieving both durability and high activity of the catalyst. Furthermore, the inventors engaged in further studies and as a result discovered that if the ratio $V_{10}/V_{90}$ of the amount of adsorption of water vapor ($V_{10}$) at 25° C. and a relative humidity of 10% and the amount of adsorption of water vapor ($V_{90}$) at 25° C. and a relative humidity of 90% is 0.002 cr less, this is suitable for achieving both high durability (resistance to oxidation loss) and high moisture retention ability. If $V_{10}/V_{90}$ is over 0.002, a drop in the durability or a drop in the moisture retention performance is caused. Therefore, more preferably $V_{10}/V_{90}$ is 0.0018 or less.

The amounts of adsorption of water vapor at 25° C. and a relative humidity of 10% and 90%, parameters in the present invention, are parameters showing the amount of water vapor adsorbed per 1 g of carbon material placed in a 25° C. environment converted to the volume of water vapor in a standard state. The amounts of adsorption of water vapor at 25° C. and a relative humidity of 10% and 90% of a carbon material may be measured using a commercially available water vapor adsorption measurement device. For the amount of adsorption of water vapor in the present invention, the values at the relative humidity of 10% and 90% of the amount of adsorption when starting adsorption from the vacuum state of a vapor pressure 0 of the water vapor, raising the relative pressure of the water vapor, and gradually making the carbon material adsorb the water vapor, that is, on an isothermal adsorption curve, are used.

As examples of the types of carbon material which can be used as the catalyst carrier, various types of manmade graphite made from coke and resins, natural graphite, carbon black, char, so-called carbon fiber, carbon nanotubes, carbon nanohorns, fullerenes, etc. may be mentioned. Further, for example, it is also possible to use a so-called cast carbon produced by using silica or another porous material as a casting mold, filling a carbon source into the pore parts of the porous material, then carburizing the carbon source, and disassembling the casting mold. Further, a composite of two or more types of these may also be used.

It is also possible to select from the above types of carbon material to give the amount of adsorption of water vapor defined by the present invention. For example, it is possible to impart activity by an alkali, impart activity by water vapor, impart activity by carbon dioxide gas, impart activity by zinc chloride, or otherwise impart activity or perform heat treatment in an inert atmosphere, reducing gas atmosphere, or atmosphere containing an oxidizing gas so as to control the amount of adsorption of water vapor.

The carbon material which can be used as the catalyst more preferably has a particle size of 10 nm to 5 μm. A carbon material which is larger than this range can be crushed for use. Crushing is preferable. If the particle size is over 5 μm, the danger of the gas diffusion paths or proton conduction paths being severed becomes higher. In addition, in particular due to economic reasons, the amount of use of the catalyst ingredient is limited. For example, when it is desired to obtain the performance by a catalyst layer of a thickness of about 10 μm, sometimes the distribution of the catalyst-carrying carbon material in the catalyst layer will become uneven. This is not preferable. Further, if the particle size is less than 10 nm, the electron conductivity becomes lower, so again this is not preferred. Furthermore, to obtain a stable performance, the carbon material preferably has a particle size of 15 nm to 4.5 μm.

As an example of the catalyst ingredient which has an oxygen reducing activity, platinum, palladium, ruthenium, gold, rhodium, osmium, iridium, or another precious metal, a composite or alloy of precious metals comprised of two or more types of these precious metals, a complex of a precious metal and organic compound or inorganic compound, a transition metal, a complex of a transition metal and an organic compound or inorganic compound, a metal oxide, etc. may be mentioned. Further, a combination of two or more types of these may also be used.

The method of production of the solid polymer type fuel cell catalyst of the present invention is not particularly limited, but the method of production of dissolving a chloroplatinic acid or other metal chlorate, metal nitrate, or metal complex in water, an organic solvent, or another solvent, then reducing this by a reducing agent to carry a catalytic activity ingredient including platinum on a carbon carrier (liquid phase adsorption) is preferable. As the reducing agent, for example, an alcohol, phenol, citric acid, ketone, aldehyde, carboxylic acid, ether, etc. may be mentioned. At that time, it is also possible to add sodium hydroxide, hydrochloric acid, etc. to adjust the pH and, furthermore, to add polyvinyl pyrrolidone or other surfactant so as to inhibit aggregation of particles. The catalyst carried on the carbon carrier may be further treated to be reduced again. As the method for repeat reduction treatment, it is possible to perform heat treatment in a reducing atmosphere or inert atmosphere at a temperature of 500° C. or less. Further, it is also possible to disperse the material in distilled water and reduce it using a reducing agent selected from an alcohol, phenol, citric acid, ketone, aldehyde, carboxylic acid, and ether.

The solid polymer type fuel cell use electrode of the present invention is characterized by including at least a catalyst layer which includes a catalyst comprised of a carbon material carrying a catalyst ingredient having an oxygen reducing activity. The catalyst layer includes not only the catalyst, but also an electrolytic material which has proton conductivity, but exhibits the effect of a catalyst regardless of the type or form of the electrolytic material or the type or structure of the binder material required for the electrode structure. These electrode forming materials are not particularly limited. Further, as the electrolytic material which has proton conductivity, a polymer introducing phosphoric acid groups, sulfonic acid groups, etc., for example, a perfluorosulfonic acid polymer, a polymer in which benzene sulfonic acid is introduced, etc. may be mentioned.

The solid polymer type fuel cell use electrode of the present invention is not particularly limited in method of production so long as including the solid polymer type fuel cell catalyst of the present invention, but the method of preparing a catalyst layer slurry comprised of the solid polymer type fuel cell catalyst of the present invention and a solvent containing an electrolytic material which has proton conductivity and coating and drying this on a Teflon® sheet or other polymer material, gas diffusion layer, or electrolytic membrane may be mentioned as an example. In the case of coating this on a Teflon® sheet or other polymer material, the method of using two Teflon® sheets or other polymer materials to sandwich an electrolytic membrane so that the catalyst layers and electrolytic membrane contact, using a hot press to fix the catalyst layers on the electrolytic membrane, then furthermore sandwich this between two gas diffusion layers by a hot press to prepare a membrane electrode assembly (MEA) may be mentioned as an example. Further, in the case of coating this on a gas diffusion layer, the method of using two gas diffusion layers to sandwich an electrolytic membrane so that the catalyst layers and electrolytic membrane contact and using a hot press etc. to fix the catalyst layers on the electrolytic membrane may be used to prepare an MEA. In the case of coating catalyst layers on the electrolytic membrane, the method of using two gas diffusion layers to sandwich the membrane so that the catalyst layers and the gas diffusion layers contact and press bonding the catalyst layers to the gas diffusion layers etc. may be used to prepare an MEA.

As the solvent which is used for the catalyst layer slurry, methanol, ethanol, isopropanol, hexane, toluene, hexane, ethyl acetate, butyl acetate, etc. may be mentioned.

As the functions of a gas diffusion layer, the function of making the gas uniformly diffuse from the gas channels formed in the separator to the catalyst layer and the function of conducting electrons between the catalyst layer and separator are sought. So long as having these functions to the minimum extent, the material is not particularly limited. As a general example, carbon cloth, carbon paper, or another carbon material is used as the main component material.

<Explanation of Overall Image of Catalyst Layer Structure>

To express the durability and moisture retention characterizing the present catalyst under various operating environments, it is sufficient to construct a catalyst layer structure suitable to the present catalyst. For this reason, in addition to the present catalyst, that is, the catalyst-carrying carbon material A, a second catalyst other than the catalyst-carrying carbon material A, that is, a catalyst-carrying carbon material B, is combined. Simultaneously, for improving the diffusion of the gas used for the reaction in the catalyst layer, it is possible to include a carbon material which does not carry a catalyst, but has a structure suitable for gas diffusion (below, "gas-diffusing carbon material") in the catalyst layer so as to enable output characteristics to be exhibited under various operating environments.

That is, a catalyst layer comprised including the present catalyst is comprised of a mixture which includes a catalyst ingredient, carbon material, and electrolytic material. The carbon material is comprised of a catalyst-carrying carbon material which carries a catalyst ingredient and a gas-diffusing carbon material which does not carry a catalyst ingredient. Further, the catalyst-carrying carbon material is comprised of two types of carbon material with different characteristics, that is, a catalyst-carrying carbon material A and a catalyst-carrying carbon material B. The catalyst-carrying carbon material of the present invention is used as the catalyst-carrying carbon material A.

The ingredients of the present invention all have functions sought from them. To express these functions, they must have the minimum extents of material properties. If a catalyst ingredient, the function as a catalyst is required, while if an electrolytic material, the function of conducting protons is required. In particular, for the carbon material, dividing the functions among three or more carbon materials is the feature of the catalyst layer structure of the present invention. The catalyst-carrying carbon material A is given the function of carrying a catalyst ingredient plus the function of storing water, the catalyst-carrying carbon material B is given the function of carrying a catalyst ingredient plus the function of efficiently diffusing the gas, the gas-diffusing carbon material is given the function of efficiently diffusing the gas and simultaneously efficiently discharging the water produced on the catalyst ingredient, and the conductivity aid carbon material is given the function of supplementing the electron conductivity of the catalyst-carrying carbon material.

<Explanation of Catalyst Carrier Carbon Material B>

For the catalyst-carrying carbon material B, a carbon material having the function of carrying a catalyst ingredient plus the function of efficiently diffusing gas is selected. In particular, to more effectively expressing the function of efficiently diffusing gas, use of a highly developed structure carbon material is preferable. For this reason, the ratio $X/S_{BET}$ of the DBP oil absorption X ml/100 g of the catalyst-carrying carbon material B and the specific surface area $S_{BET}$ evaluated by BET has to be 0.2 to 3.0. Here, the "specific surface area $S_{BET}$ evaluated by BET" is the value of the specific surface area found by the BET method from measurement of the isothermal adsorption line of nitrogen gas at the liquid nitrogen temperature. A preferable example of the material is carbon black. Carbon black is comprised of primary particles which melt bond to form secondary structures. Depending on the type, this structure becomes highly developed. This structure becomes primary particles linked together surrounding spaces between them. If using a carbon material having such a structure for the catalyst-carrying carbon material B, the surrounded spaces form gas diffusion paths or paths for movement of water, so this is preferable.

That is, the catalyst-carrying carbon material A selected is a carbon material having the property of easy storage of water, but a carbon material having such a property is not necessarily highly developed in structure, so by deliberately combining a highly developed structure catalyst-carrying carbon material B, it is possible to form gas diffusion paths near the catalyst-carrying carbon material A. In particular, the time of high load operation or under high humidification conditions, it is possible to prevent the gas diffusion paths from being blocked by water, so this is preferable.

The degree of structure can be determined by observation under an electron microscope, but can also be judged by the relationship between the DBP oil absorption and the specific surface area.

The "DBP oil absorption" is the amount of dibutyl phthalate which is absorbed by carbon black when dibutyl phthalate is brought into contact with a unit mass of carbon black. The DBP is mainly absorbed in the interstices between the primary particles, so if the structure is highly developed, the DBP oil absorption becomes larger, while if the structure is not that well developed, the DBP oil absorption tends to become smaller. However, the DBP is not only absorbed in the interstices of the primary particles, but also absorbed in the fine pores formed inside the primary particles, so the DBP oil absorption does not always express the extent of the structure as it is. If the specific surface area measured by the nitrogen adsorption becomes larger, the amount of DBP which is absorbed in the fine pores becomes greater. The overall DBP oil absorption also tends to become larger. Therefore, in highly developed structure carbon black, the DBP oil absorption becomes greater proportional to the nitrogen adsorption, while conversely in less highly developed structure carbon black, the DBP oil absorption becomes smaller proportional to the nitrogen adsorption.

If using a carbon material with a ratio $X/S_{BET}$ of the DBP oil absorption X ml/100 g and the specific surface area $S_{BET}$ m$^2$/g evaluated by BET of 0.2 to 3.0 for the catalyst-carrying carbon material B, it is possible to secure the conductive paths while securing the gas diffusion paths and paths of movement of water and possible to obtain a high performance catalyst layer. If the ratio of $X/S_{BET}$ is less than 0.2, the spaces used as the gas diffusion paths become sparser and stable performance of the catalyst layer is difficult to draw out. If over 3.0, the conductivity is impaired. To draw out more stable performance, the ratio of $X/S_{BET}$ is preferably made 0.22 to 2.7.

The catalyst-carrying carbon material B is not particularly limited so long as a general carbon material. In the above way, any carbon material with a ratio $X/S_{BET}$ of the DBP oil absorption X ml/100 g and the specific surface area $S_{BET}$ m$^2$/g evaluated by BET of 0.2 to 3.0 may be used as a preferable carbon material. In particular, a material which undergoes a chemical reaction other than the reaction which is inherently sought or from which the substance forming the carbon material dissolves out upon contact with condensed water is not preferred. A chemically stable carbon material is preferable. As the catalyst-carrying carbon material B, carbon black, graphite, carbon fiber, activated carbon, etc. and crushed forms of the same, carbon nanofibers, carbon nanotubes, and other carbon compounds etc. may be used. Furthermore, two or more types of these may be used mixed together. Further, for example, it is also possible to use a so-called cast carbon produced by using silica or another porous material as a casting mold, filling a carbon source into the pore parts of the porous material, then carburizing the carbon source, and disassembling the casting mold. As an example of the most preferable carbon material, carbon black may be mentioned.

Further, the primary particle size of the catalyst-carrying carbon material B is more preferably 5 μm to 5 nm. A carbon material larger than this range can be used crushed. Crushing is preferable. If the primary particle size is over 5 μm, there is a high possibility of the gas diffusion paths or the proton conduction paths being severed. In addition, in particular, due to economic reasons, the amount of use of the catalyst ingredient is limited. For example, when it is desired to obtain the performance by a catalyst layer of a thickness of about 10 μm, sometimes the distribution of the catalyst-carrying carbon material in the catalyst layer will become uneven. This is not preferable. Further, if the primary particle size is less than 5 nm, the electron conductivity becomes lower, so again this is not preferred.

In the catalyst layer, the preferable contents of the catalyst-carrying carbon materials A and B in a catalyst layer are affected by the types of the catalyst-carrying carbon materials A and B, the type and content of the gas-diffusing carbon material, and the types and carried rates of the catalyst ingredients, so cannot be specified. However, if the content in the catalyst layer combining the catalyst-carrying carbon materials A and B is in the range of 5 mass % to 80 mass %, at the least, the fuel cell functions and the effect of the present invention can be obtained. If illustrating a more preferable range, there is 10 mass % to 60 mass %. If outside this range, the balance with other ingredients becomes poor and sometimes an efficient fuel cell is not obtained. For example, if less than 5 mass %, the amount of catalyst ingredient which is carried on the catalyst-carrying carbon material A or B is kept low and sufficient performance sometimes cannot be exhibited. Further, for example, if over 80 mass %, the amount of the electrolytic material becomes too small and the proton conduction paths become sparse, so again a good efficiency cell does not result in some cases.

The mass ratio A/(A+B) of the catalyst-carrying carbon material A and the catalyst-carrying carbon material B contained in the catalyst layer of the present invention is preferably 0.2 to 0.95 in range. If the mass ratio A/(A+B) of the catalyst-carrying carbon material A and the catalyst-carrying carbon material B is less than 0.2, it is hard for composite effect of the catalyst-carrying carbon material A to be obtained. At the time of low load operation or under low humidification conditions, the content of the electrolyte substance in the catalyst layer easily falls and the internal resistance due to the proton conductivity easily rises, so this is not preferable. If the mass ratio A/(A+B) of the catalyst-carrying carbon material A and the catalyst-carrying carbon material B is over 0.95, at the time of high load operation or under high humidification conditions, the gas diffusion paths are easily blocked, so this is not preferable.

<Gas-Diffusing Carbon Material>

The carbon material which is used as the gas-diffusing carbon material is one which can form gas diffusion paths. A material which undergoes a chemical reaction other than the reaction which is inherently sought or from which the substance forming the carbon material dissolves out upon contact with condensed water is not preferred. A chemically stable carbon material is preferable. Further, the gas-diffusing carbon material preferably has a particle size of 1 µm to 5 nm. A carbon material larger than this range can be crushed for use. If the particle size is over 1 µm, the function of securing gas diffusion paths can no longer be expected. The distribution of the gas-diffusing carbon material in the catalyst layer easily becomes uneven, so this is not preferable. Further, if the particle size is less than 5 nm, sometimes the preferable gas diffusion paths cannot be obtained. Furthermore, to obtain a stable performance, the particle size of the gas-diffusing carbon material is preferably 6 nm to 0.9 µm.

Further, as a preferable gas-diffusing carbon material, carbon black is the most general. In addition, if gas diffusion paths can be formed, graphite, carbon fiber, activated carbon, etc. or their crushed forms, carbon nanofibers, carbon nanotubes, or other carbon compounds etc. may be used. Further, for example, it is also possible to use a so-called cast carbon produced by using silica or another porous material as a casting mold, filling a carbon source into the pore parts of the porous material, then carburizing the carbon source, and disassembling the casting mold. Further, two or more types of these may be mixed for use. Furthermore, in the present invention, if aggregating the gas-diffusing carbon materials together in the catalyst layer as an aggregation phase, in the electrolytic material, the gas diffusion paths become harder to block and gas more easily diffuses in the catalyst layer, so this is preferable. The gas diffusion paths which are formed by the aggregation phase are hard to destroy even when strongly fastening the cell. It is easy to maintain the optimum pore size controlled to at the time of formation of the catalyst layer over a long period.

For the gas-diffusing carbon material, use of a more highly developed structure carbon black is preferable. The carbon black is comprised of primary particles which melt bond to form secondary structures. Depending on the type, this structure becomes more highly developed. This structure becomes primary particles linked together surrounding spaces between them. In the catalyst layer included in the present invention, the gas-diffusing carbon material links up such spaces to form continuous spaces surrounded by the network of primary particles as gas diffusion paths in the catalyst layer. This is also one aim. Therefore, in the case of a gas-diffusing carbon material using the carbon black, it is possible to easily form a structure aggregating the gas-diffusing carbon materials in the catalyst layer. The gas diffusion paths which are formed by aggregating the gas-diffusing carbon materials are hard to destroy even when strongly fastening the cell. It is easy to maintain the optimum pore size controlled to at the time of formation of the catalyst layer over a long period.

By using a carbon material with a ratio $X/S_{BET}$ of the DBP oil absorption X ml/100 g and the specific surface area $S_{BET}$ m²/g evaluated by BET of 1 or more for the gas-diffusing carbon material of the present invention, it is possible to form a catalyst layer provided with more preferable gas diffusion paths. If the ratio of $X/S_{BET}$ is 1 or more, the spaces which are formed in the interstices between the primary particles of the highly developed structure carbon black become larger and formation of gas diffusion paths preferable for the cell reaction can be expected. If the ratio of $X/S_{BET}$ is less than 1, the gas diffusion paths formed by this structure become sparser and the interstices between the secondary particles of the carbon black mainly form the gas diffusion paths, so a sufficient pore size cannot be secured or the pores are easily destroyed at the time of fastening the cell, so sometimes control is hard and stable performance of the catalyst layer is hard to draw out. More preferably, the ratio of $X/S_{BET}$ is 1.5 or more. If 1.5 or more, the pore size of the gas diffusion paths formed by the structure is sufficiently large. Even if a high current is taken out, flooding becomes harder. If such a structure, the gas easily diffuses and blocking of the gas diffusion paths by water becomes further harder to occur, so the catalyst in the catalyst layer can be effectively utilized and a high output fuel cell can be obtained even with a smaller amount of catalyst.

Further, the gas-diffusing carbon material is more preferably selected from carbon materials with small hydration forces. By including a carbon material with a small hydration force on which no catalyst ingredient is carried, that is, a gas-diffusing carbon material, in a catalyst layer, it is possible to cause more extensive formation of paths in the catalyst layer over which the gas can be diffused. If the anode, hydrogen or a mixed gas mainly comprised of hydrogen, while if the cathode, oxygen, air, etc. easily diffuse in the catalyst layer and can contact more of the catalyst surface. For this reason, it is possible to make the reaction proceed more efficiently at the catalyst layer and obtain a high cell performance. If selecting a carbon material with a small hydration force for the gas-diffusing carbon material, when fluctuations in the operating conditions cause the catalyst layer to be exposed to high humidification conditions or when operation in the high current density region causes the production of a large amount of water in the catalyst, it is possible to prevent water from blocking the gas diffusion paths and possible to prevent the cell performance from dropping.

Therefore, if the gas-diffusing carbon material contained in the fuel cell of the present invention has a small hydration force of an amount of adsorption of water vapor at 25° C. and a relative humidity of 90% of 50 ml/g or less, it is possible to effectively suppress blocking of the gas diffusion paths by water at the time of large current discharge and possible to take out current by a stable voltage. If over 50 ml/g, at the time of current discharge, condensed water pools in the catalyst layer, the gas diffusion paths are easily severed, and the voltage behavior becomes unstable.

To obtain a further higher effect, it is also possible to use a carbon material with a hydration force in a more suitable range as the gas-diffusing carbon material. Specifically, a carbon material with an amount of adsorption of water vapor at 25° C. and a relative humidity of 90% of 1 ml/g to 20 ml/g is selected as a gas-diffusing carbon material. If in this range, it is possible to suppress excessive drying of the electrolytic material in a catalyst layer and, even at the time of large current discharge, efficiently discharge water produced inside the catalyst layer outside of the catalyst layer and secure the gas diffusion paths, so it is possible to obtain an efficient cell across the entire region from a low load to a high load, that is, regardless of the load conditions. If the amount of adsorption of water vapor at 25° C. and a relative humidity of 90% is less than 1 ml/g, the hydration force becomes too small (water repellency becomes too strong) and excessive drying is sometimes invited. If the amount of adsorption of water vapor at 25° C. and a relative humidity of 90% becomes over 20 ml/g, when continuously taking out a large current etc., the discharge of water produced inside the catalyst layer cannot keep up and the gas diffusion paths sometimes end up being severed. In this case, the effect of adding the gas-diffusing carbon material becomes low. An absorption of 2 ml/g to 18 ml/g is more preferable.

The content of the gas-diffusing carbon material in a catalyst layer is more preferably a range of 3 mass % to 30 mass %. If less than 3 mass %, the gas diffusion paths cannot be sufficiently formed and the effect of including the gas-diffusing carbon material cannot be expected. If over 30 mass %, the proton conduction paths are severed by the gas-diffusing carbon material and become sparser and the drop in internal resistance becomes larger, so the cell performance sometimes falls. If in the range of 3 mass % to 30 mass %, the interstices in the gas-diffusing carbon material form a network in the catalyst layer. These become gas diffusion paths, so it is possible to effectively utilize the catalyst ingredient in the catalyst layer. While also depending on the type or form of the carbon material used, 5 mass % to 25 mass % is most preferable. If in this range, it is possible to form the optimum gas diffusion paths without impairing the proton conduction paths and electron conduction paths, so it is possible to obtain an electrode of a fuel cell which has extremely efficient power generation characteristics.

<Method of Controlling Hydration Force of Carbon Material>

Control of the hydration force of various types of carbon materials included in the fuel cell can be achieved by selection from generally existing carbon materials using the amount of adsorption of water vapor as a parameter. Alternatively, even in the case of a carbon material having an amount of adsorption of water vapor smaller than the suitable range, it is possible to treat the surface of the carbon material by an acid, base, etc. or expose it to an oxidizing atmosphere environment so as to increase the amount of adsorption of water vapor to the suitable range. While not limited to this, for example, it is possible to treat the material in warmed concentrated nitric acid, dip it in a hydrogen peroxide aqueous solution, heat treat it in an ammonia stream, dip it in a warmed sodium hydroxide aqueous solution, heat it in KOH or NaOH, or treat it by heating in dilute oxygen or dilute NO or $NO_2$ so as to increase the amount of adsorption of water vapor. Conversely, if the amount of adsorption of water vapor is too great, it is possible to fire the material in an inert atmosphere so as to lower the amount of adsorption of water vapor to the suitable range. While not limited to this, for example, it is possible to treat the material by heating in an argon, nitrogen, helium, vacuum, or other atmosphere so as to lower the amount of adsorption of water vapor.

<Explanation of Electrolytic Material>

The fuel cell according to the present invention exhibits its effects regardless of the type of the electrolytic material which is used. The electrolytic material which is used is not particularly limited so long as having the function of conducting protons. As the electrolytic material which is used in the electrolytic membrane or catalyst layer, a polymer introducing phosphoric acid groups, sulfonic acid groups, etc., for example, a perfluorosulfonic acid polymer, a polymer in which benzene sulfonic acid is introduced, etc. may be mentioned. However, the electrolytic material is not limited to a polymer. It is also possible to use an inorganic, an inorganic-organic hybrid, or other electrolytic membrane for the fuel cell. If illustrating a particularly suitable range of operating temperatures, a fuel cell which operates in the range of ordinary temperature to 150° C. is preferable. Further, the mass ratio of the catalyst-carrying carbon material and electrolytic material contained in the catalyst layer is preferably 1/10 to 5/1. If the catalyst-carrying carbon material is less than 1/10, sometimes the catalyst surface ends up being excessively covered by the electrolytic material and the area by which the reaction gas can contact the catalyst ingredient becomes smaller. If the catalyst-carrying carbon material is excessively contained in more than 5/1, the network of the electrolytic material becomes sparser and the proton conductivity sometimes becomes lower.

<Two-Phase Aggregation Structure>

The catalyst layer may be made two aggregation phase structures of a catalyst aggregation phase formed by aggregation of a catalyst ingredient, catalyst-carrying carbon material A, catalyst-carrying carbon material B, and electrolytic material as main ingredients and a carbon material aggregation phase formed by aggregation of a gas-diffusing carbon material as the main ingredient. Further, if making the structure one where the catalyst aggregation phase is continuous and the gas-diffusing carbon material aggregation phase is dispersed in the catalyst aggregation phase, it is possible to strikingly improve the cell characteristics compared with a catalyst layer in which the ingredients are simply mixed on the average. FIG. 1 is a schematic view relating to the structure of the catalyst layer according to the present invention. In FIG. 1, the materials and the aggregation phases are expressed schematically, so the relative sizes of the layer structures differ from the actual sizes.

By making the catalyst layer a catalyst layer which has two aggregation phase structures, three special effects are obtained. First, it is possible to make the gas-diffusing carbon material effectively function. That is, by keeping the catalyst ingredient and the electrolytic material from contacting the surface of the gas-diffusing carbon material as much as possible, it is possible to make maximum use of the surface characteristics of the gas-diffusing carbon material and the structural characteristics such as the structure, while by making the gas-diffusing carbon materials aggregate, it is possible to continuously form the pores formed by the interstices of the gas-diffusing carbon material as the gas diffusion paths.

Second, by including in a catalyst layer a catalyst-carrying carbon material A which carries a catalyst ingredient, a catalyst-carrying carbon material B which carries a catalyst ingredient, and an electrolytic material as a single aggregate (catalyst aggregation phase), even under dry conditions, the water which the catalyst-carrying carbon material A stores can effectively moisten the electrolytic material and prevent the rise of proton conduction resistance of the electrolytic material. Further, the catalyst-carrying carbon material B is also present, so it is possible to form gas diffusion paths even inside the catalyst aggregation phase and further make the reaction proceed on the catalyst ingredient carried on the catalyst-carrying carbon material B even in environments where the carrier carbon material A is covered by water at the time of high load operation or under high humidification conditions.

Third, by using the electrolytic material as the medium and using the strongly bonded catalyst aggregation phase as the continuous phase in the catalyst layer of the present invention, it is possible to increase the mechanical strength of the catalyst layer itself, while by making the network of the electrolytic material continuous, it is possible to reduce the proton conduction resistance forming the greatest cause of the increase of internal resistance in the catalyst layer.

<Examination of Aggregation Structure>

The catalyst layer structure can also be confirmed by examining the cross-section. By preparing a cut cross-section by any angle at any location of the catalyst layer and examining that cross-section, it is possible to confirm that the carbon material which does not carry the catalyst ingredient forms an aggregate (aggregation phase). The aggregate corresponds to the gas-diffusing carbon material aggregation phase in the present invention.

In a field of an area of 10 μm×10 μm in a cross-section of the catalyst layer, it is preferable that there be at least one gas-diffusing carbon material aggregation phase which does not have a catalyst ingredient and has a size of a circle equivalent diameter of 300 nm or more. If less than one, the various types of carbon materials end up being mixed averagely at the time of formation of the catalyst layer or the content of the carbon material which does not carry a catalyst ingredient, that is, the gas-diffusing carbon material, is too low, so at least the gas-diffusing carbon material is not dispersed forming an aggregation phase. Therefore, the catalyst layer is not formed with gas conduction paths, is poor in gas diffusion ability, and cannot express stable performance in particular under high humidification conditions or at the time of high load operation. More preferably, in the same field, there is at least one gas-diffusing carbon material aggregation phase which does not have a catalyst ingredient and has a size of a circle equivalent diameter of 500 nm or more. If the structure, the power generation performance is kept from becoming unstable under at least wet conditions and stable power generation performance is obtained.

The method of formation of a cut cross-section of the catalyst layer is not particularly limited, but, for example, it is possible to mention the method of cutting a catalyst layer by a cutter knife or scissors or cutting a catalyst layer which has been cooled to the glass transition temperature of the electrolyte substance or less and observing that cross-section. A particularly preferable method is the method of using a cryomicrotome etc. to form a cut cross-section of the catalyst layer in an environment which has been cooled by liquid nitrogen. The method of using a cryomicrotome to prepare an ultrathin slice for examination may be considered, but more simply there is the method of setting a catalyst layer as a sample in the cryomicrotome, using a trimming knife made by diamond or glass to cut the catalyst layer surface, and examine the cut surface produced.

For the method of examination, it is possible to examine the same field by both the secondary electron image and the reflected electron image. A scan type electron microscope enabling examination by a power of at least 10,000× is preferable. The secondary electron image has information on the surface relief of the cross-section of the catalyst layer reflected in it and enables confirmation of the presence of the carbon material, electrolytic material, and pores. If using a high precision electron microscope, the existence of the catalyst ingredient can be confirmed, but if examining the reflected electron image of the same field, information on the distribution of ingredients is reflected. For example, if a metal is used for the catalyst ingredient, an image is obtained where the catalyst ingredient shows up bright while the locations with no catalyst ingredient show up with a dark contrast. If comparing the secondary electron image and reflected electron image of the catalyst layer according to the present invention, in the same field, regardless of the presence of the carbon material in the secondary electron image, in the reflected electron image, portions of a dark contrast, that is, carbon material which has no catalyst ingredient, are observed. These portions, that is, portions of a carbon material which does not have a catalyst ingredient, correspond to the gas-diffusing carbon material aggregation phase. A circle equivalent diameter of the outer circumference of 300 nm or more is a preferable embodiment of the present invention.

An example enabling the more quantitative discrimination of the presence of a gas-diffusing carbon material aggregation phase which does not have a catalyst ingredient of a size of a circle equivalent diameter of 300 nm or more will be explained next. The reflected electron image is obtained by a power of 10,000×, a resolution of 272 DPI×272 DPI or more, and a luminance of 256 shades. The luminance of the obtained image is binarized using image analyzing software to display the range from dark to the 110th shade by black and the range from the 111th shade to bright to the 256th shade by white. With this as is, there will be many black points isolated in island shapes, so to clarify the targeted range, the black points are dilated once to confirm the adjoining points. Furthermore, fill-in processing is performed to fill in the blank parts in the range and make the range appear to be the same. Finally, contraction is performed to return the dilated parts and clarify the targeted range. After this, the circle equivalent diameter of each black part is calculated from the area of each black part and parts of less than 300 nm are all cut. The presence of a carbon material in the remaining black parts in the secondary electron image is a preferable embodiment of the present invention. When performing such quantitative analysis, it is preferable to analyze a more average cross-section of the catalyst layer. For example, the method of analyzing about five randomly selected fields of a randomly selected cross-section and using their average value for judgment is preferable.

<Explanation of Two-Layer Laminated Structure>

Further, on the other hand, at the catalyst layer, it is possible to employ an at least two-layer or more laminated structure (multilayer catalyst layer). It is possible to make the side which is contiguous with the electrolytic membrane side the inner layer, place the high water retaining catalyst-carrying carbon material A at the inner layer, make the side opposite to the electrolytic membrane across the inner layer the outer layer, and place a highly structured catalyst-carrying carbon material B at the outer layer to thereby obtain a catalyst layer.

In the above-mentioned at least two-layer or more laminated structure catalyst layer, if the inner layer is contiguous with the side which contacts the proton conductive electrolytic membrane and the outer layer is the outermost layer at the side which is not contiguous with the proton conductive electrolytic membrane, this may also be made a three-layer structure or more. That is, it is also possible for there to be one or more intermediate catalyst layers between the inner layer and the outer layer. At this time, the intermediate catalyst layer is preferably a catalyst layer having intermediate properties of the inner layer and the outer layer. For example, preferably the catalyst-carrying carbon material which is contained in the intermediate layer is a mixture of the catalyst-carrying carbon material A and the catalyst-carrying carbon material B; when there are a plurality of intermediate layers/ the mass ratio A/(A+B) of the catalyst-carrying carbon material A and the catalyst-carrying carbon material B gradually decreases from the inner layer direction to the outer layer direction; etc. Further, when there is a single intermediate layer, in the intermediate layer, the mass ratio A/(A+B) of the catalyst-carrying carbon material A and the catalyst-carrying carbon material B may continuously decrease from the inner layer direction to the outer layer direction.

Furthermore, each layer of the above multilayer structure may be made two aggregation phase structures of the above catalyst aggregation phase and gas-diffusing carbon material aggregation phase. By applying a structure where the catalyst aggregation phase is continuous and the gas-diffusing carbon material aggregation phase is dispersed in the catalyst aggregation phase, it is possible to strikingly improve the power generation characteristics.

<Explanation of Conductivity Aid>

In the inner layer including the catalyst-carrying carbon material A of the multilayer catalyst layer, it is effective to combine a conductivity aid carbon material in accordance with need. The catalyst-carrying carbon material A is a structure having pores in the surface of the carbon material for securing an amount of adsorption of water vapor. In general, when aggregating a porous carbon material, it is possible to add a specific conductivity aid carbon material with a high conductivity so as to improve the conductivity of the aggregate.

The type of the conductivity aid carbon material is not particularly limited so long as a generally existing carbon material which has electron conductivity, but a material which undergoes a chemical reaction other than the reaction which is inherently sought or from which the substance forming the carbon material dissolves out upon contact with condensed water is not preferred. A chemically stable carbon material is preferable. Further, the gas-diffusing carbon material preferably has a particle size of 1 μm to 5 nm. A carbon material larger than this range can be crushed for use. If the particle size is over 1 μm, the distribution of the gas-diffusing carbon material in the catalyst layer easily becomes uneven, so this is not preferable. Further, if the particle size is less than 5 nm, the electron conductivity becomes low, so this is not preferred in some cases. As the preferable conductivity aid carbon material, carbon black is most general, but in addition, if having electron conductivity, graphite, carbon fiber, activated carbon, etc. or crushed forms of these, carbon nanofibers, carbon nanotubes, or other carbon mixtures etc. may be used. Further, it is also possible to mix two or more types of these for use. Among these, one where the electron conductivity of the conductivity aid carbon material is at least the electron conductivity of the catalyst-carrying carbon material A is more preferable.

For the conductivity aid carbon material of the present invention, use of a carbon material with a certain extent of structure formed is preferable. A preferable example of the material is carbon black. Carbon black is comprised of primary particles which melt bond to form secondary structures. Depending on the type, this structure becomes highly developed. This structure becomes primary particles linked together surrounding spaces between them. If using a carbon material having such a structure for the conductivity aid carbon material, the surrounded spaces form gas diffusion paths or paths for movement of water, so this is preferable.

If using a carbon material with a ratio $X/S_{BET}$ of the DBP oil absorption X ml/100 g and the specific surface area $S_{BET}$ m$^2$/g evaluated by BET of 0.2 to 3.0 for the conductivity aid carbon material, it is possible to secure the conductive paths while securing the gas diffusion paths and paths of movement of water, so it is possible to obtain a higher performance catalyst layer. If the ratio of $X/S_{BET}$ is less than 0.2, the spaces forming the gas diffusion paths become sparser and sometimes it is difficult to draw out stable performance of the catalyst layer. If over 3.0, the conductivity is sometimes impaired. This is sometimes not preferred.

The content of the conductivity aid carbon material in the catalyst layer inner layer is preferably 3 mass % to 30 mass % in range. If in this range, even if the catalyst-carrying carbon material A itself is inferior in electron conductivity, the conductivity aid carbon material can effectively collect current from the catalyst ingredient. If less than 3 mass %, the effect of addition is small and the current collecting effect sometimes becomes lower. If over 30 mass %, the density of the catalyst ingredient in the catalyst layer inner layer ends up falling too much. In particular, when using air for the cathode gas etc., the polarization of concentration sometimes becomes greater. This is sometimes not preferable. In particular, it is more preferable if the mass of the conductivity aid carbon material is in the range of 0.05 to 0.4 with respect to the mass of the catalyst-carrying carbon material A. If in this range, the difference between the power generation characteristics under wet conditions and the power generation characteristics under dry conditions becomes smaller and stable characteristics not affected much by the conditions can be exhibited. If less than 0.05, the inner layer falls in electron conductivity, so the internal resistance rises and the performance sometimes drops. If over 0.4, the density of the catalyst ingredient in the catalyst layer inner layer ends up falling too much. In particular, when using air for the cathode gas etc., the polarization of concentration sometimes becomes greater. This is sometimes not preferred.

The optimum range of oxygen content of the conductivity aid carbon material of the present invention is not more than 5 mass %, more preferably not more than 3 mass %. If the oxygen content of the conductivity aid carbon material is over 5 mass %, the current collection effect of the conductivity aid carbon material falls, so sometimes the effect of use of the conductivity aid carbon material can no longer be obtained. There is no particular lower limit to the oxygen content. Good characteristics can be exhibited even if there is almost no oxygen contained.

<Method of Production of Catalyst Layer>

The method of production of the catalyst layer which is included in the fuel cell according to the present invention is not particularly limited so long as enabling production so that the gas-diffusing carbon material aggregation phase is dispersed in the catalyst aggregation phase as a continuous phase and the electrolytic material is kept from being adsorbed at the gas-diffusing carbon material surface as much as possible. If necessary, water or an organic solvent is added to the solution containing the material forming the catalyst layer to prepare an ink. It is possible to dry this ink in a film and form a catalyst layer.

A particularly preferable method of preparation of a catalyst layer is explained below.

The catalyst-carrying carbon material A which carries a catalyst ingredient, the catalyst-carrying carbon material B which carries a catalyst ingredient, and the electrolytic material are crushed and mixed in a good solvent for the electrolytic material, then a weak solvent for the electrolytic material is added and the electrolytic material and the catalyst-carrying carbon material which carries the catalyst are aggregated to obtain a solution A. A gas-diffusing carbon material which does not carry a catalyst ingredient is crushed in a weak solvent for the electrolytic material to obtain a solution B. The solution A and the solution B are mixed to obtain a solution C. This is used as ink which is dried to a film to obtain the catalyst layer.

With this method, if crushing and mixing the catalyst-carrying carbon material A which carries a catalyst ingredient and the catalyst-carrying carbon material B which carries a catalyst ingredient together with the electrolytic material in a good solvent for the electrolytic material, the catalyst-carrying carbon materials A and B are mixed and crushed to a fine aggregate. The electrolytic material is present dissolved near the surface. If adding a weak solvent for the electrolytic material to this and causing the precipitation of the electrolytic material, the catalyst-carrying carbon materials A and B which carry the catalyst and the electrolytic material particles aggregate whereby the electrolytic material is fixed to the catalyst-carrying carbon materials A and B which carry the catalyst. Furthermore, if a fine gas-diffusing carbon material is added to this solution, since the electrolytic material is fixed to the catalyst-carrying carbon material, the gas-diffusing carbon material surface is resistant to coverage by the electrolytic material and the surface properties originally held by the surface of the gas-diffusing carbon material can be made use of. That is, this results in a structure of two aggregation phases of the catalyst aggregation phase and the gas-diffusing carbon material aggregation phase of the present invention. The structure becomes one where the catalyst aggregation phase is continuous and the gas-diffusing carbon material aggregation phase is dispersed in the catalyst aggregation phase. In particular, this method is effective when using the gas-diffusing carbon material controlling the hydration of the surface. Further, by changing the method of mixing the solution A and the solution B, it is possible to control the dispersed state (shape and size) of the gas-diffusing carbon material aggregation phase.

The catalyst-carrying carbon materials A and B which carry a catalyst ingredient and a fine amount of electrolytic material are crushed and mixed in a good solvent for the electrolytic material, then dried to, solidify them. A weak solvent for the electrolytic material is added to this solid, then solid is crushed, then a solution in which the electrolytic material is dissolved is added dropwise to obtain a solution A. The gas-diffusing carbon material which does not carry a catalyst ingredient is crushed in a weak solvent for the electrolytic material to obtain a solution B. The solution A and the solution B are mixed to obtain a solution C. This is used as ink which is dried to a film to obtain the catalyst layer.

With this method, if crushing and mixing the catalyst-carrying carbon materials A and B which carry a catalyst ingredient together with the electrolytic material in a good solvent for the electrolytic material, then drying the solution, the fine amount of electrolytic material is fixed in a film state to the surface of the catalyst-carrying carbon material which carries a catalyst ingredient. If crushing the solid obtained by this drying (catalyst-carrying carbon material A and catalyst-carrying carbon material B in which a fine amount of electrolytic material is fixed) in a weak solvent for the electrolytic material, the electrolytic material is granulated while fixed to the catalyst-carrying carbon materials which carry a catalyst ingredient. Furthermore, to this suspension, a sufficiently required electrolyte solution, is added dropwise to make the electrolytic material precipitate and produce a dispersion comprised of the catalyst-carrying carbon materials A and B to which the electrolytic material is slightly fixed and the precipitated electrolytic material aggregated together. If adding a gas-diffusing carbon material to this dispersion, in the same way as the method of (i), the electrolytic material is fixed or aggregated at the surface of the catalyst-carrying carbon material which carries the catalyst, so the gas-diffusing carbon material surface is resistant to coverage by the electrolytic material and it is possible to make use of the surface properties which the surface of the gas-diffusing carbon material inherently possesses. That is, this results in a structure of two aggregation phases of the catalyst aggregation phase and the gas-diffusing carbon material aggregation phase of the present invention. The structure becomes one where the catalyst aggregation phase is continuous and the gas-diffusing carbon material aggregation phase is dispersed in the catalyst aggregation phase. In particular, this method is effective when using the gas-diffusing carbon material controlling the hydration of the surface. Further, by changing the method of mixing the solution A and the solution B, it is possible to control the dispersed state (shape and size) of the gas-diffusing carbon material aggregation phase.

The "good solvent for an electrolytic material" used in these methods of preparation of catalyst layer is a solvent which substantially dissolves the used electrolytic material. This depends on the type and molecular weight of the electrolytic material, so is not particularly limited, but if giving specific examples, as a good solvent for a perfluorosulfonic acid polymer contained in a commercially available 5% Nafion® solution made by Aldrich, Methanol, ethanol, isopropyl alcohol, etc. may be mentioned.

Further, the "weak solvent for an electrolytic material" used in these methods of preparation of catalyst layer is a solvent which substantially does not dissolve the used electrolytic material. The solvent differs according to the type and molecular weight of the electrolytic material, so cannot be specified. For example, if illustrating a weak solvent for a perfluorosulfonic acid polymer contained in a commercially available 5% Nafion® solution made by Aldrich, hexane, toluene, benzene; ethyl acetate, butyl acetate, etc. may be mentioned.

The method of crushing or crushing and mixing in the preferable method of preparation of a catalyst layer of the above (i) or (ii) is not limited so long as able to achieve the object of crushing the large aggregate of the catalyst-carrying carbon material or gas-diffusing carbon material to reduce it to an aggregate of at least 1 μm or less. As general methods, giving examples, the method of use of ultrasonic waves, the method of using a ball mill, glass beads, etc. for mechanical crushing, etc. may be mentioned.

When using a gas diffusion layer for a fuel cell of the present invention, the function of uniformly diffusing gas from the gas channels formed in the separator to the catalyst layer and the function of conducing electrons between the catalyst layer and the separator are sought. The layer is not particularly limited so long as these functions are provided. In a general example, carbon cloth, carbon paper, or another carbon material is used as the main component material. It possible to impart gas diffusion, electron conductivity, and corrosion resistance, a metal mesh, metal wool, or other metal material may be used.

As a preferable example of the structure of the gas diffusion layer, a two-layer structure comprised of a gas diffusion fiber layer where the layer at the separator side of the gas diffusion layer is mainly made of a fibrous carbon material and of a micropore layer where the layer at the catalyst layer side is mainly made of carbon black may be mentioned.

The method of drying the ink to a film may be a generally proposed method and is not particularly limited.

For example, if coating the ink on the gas diffusion layer, brushing; spraying, roll coating, ink jet printing, screen printing, or another method may be mentioned. Alternatively, it is possible to select the method of coating the ink by bar coating, brushing, spraying, roll coating, ink jet printing, screen printing, or another method and drying it to form a catalyst layer on the surface of a polytetrafluoroethylene (PTFE) sheet, PTFE sheet, or other polymer material once as a separate material, then bonding this to the gas diffusion layer by hot pressing or another method to thereby form a gas diffusion electrode.

Thus prepared gas diffusion electrodes can be press bonded with an electrolytic membrane such as a perfluorosulfonic acid polymer by a hot press etc. to form a membrane electrode assembly (MEA).

Alternatively, an MEA may be formed by the method of coating an ink on a PTFE sheet, PTFE plate, or other polymer material by brushing, spraying, roll coating, ink jet printing, screen printing, or other method, then drying it to form a catalyst layer once on separate materials, then bonding these to an electrolytic membrane such as a perfluorosulfonic acid polymer by hot pressing or another method, the method of preparing an assembly of catalyst layers and an electrolytic membrane by the method of directly coating and drying ink on an electrolytic membrane such as a perfluorosulfonic acid polymer, then press bonding gas diffusion layers to the catalyst layers by hot pressing, or another method.

The above such prepared MEA is generally provided with separators at its outsides to form a unit cell. These may be stacked in accordance with the required output for use as a fuel cell.

Example 1

Test Pieces Relating to Present Catalyst

Various types of manmade graphite made from coke and resins, natural graphite, carbon black, char, so-called carbon fiber, carbon nanotubes, carbon nanohorns, fullerenes, or other carbon materials are treated to impart activity by an alkali, impart activity by water vapor, impart activity by carbon dioxide gas, impart activity by zinc chloride, or otherwise impart activity or are heat treated in an inert atmosphere, reducing gas atmosphere, or atmosphere containing an oxidizing gas so as to prepare 13 types of carbon materials from A to M shown in Table 1 with values of amount of adsorption of water vapor $V_{10}$, $V_{90}$, and $V_{10}/V_{90}$ as catalyst carriers. A chloroplatinic acid aqueous solution and polyvinyl pyrrolidone are placed in distilled water. While stirring at 90° C., sodium borohydride is dissolved in distilled water, then poured in to reduce the chloroplatinic acid. To this aqueous solution, the carbon material forming the catalyst carrier is added. The mixture is then stirred for 60 minutes, then filtered and the result washed. The obtained solid is dried at 90° C. in vacuo, then crushed and heat treated in a hydrogen atmosphere at 250° C. for 1 hour to thereby prepare Catalyst Nos. 1 to 13. Further, the amount of platinum carried on the catalyst was adjusted to 50 mass %.

The amount of adsorption of water vapor of the carbon material was measured using a constant volume type water vapor adsorption device (BELSORP18 made by Bel Japan). A sample which was pretreated by deaeration at 120° C. and 1 Pa or less for 2 hours was held at a 25° C. constant temperature. Water vapor was gradually supplied to increase the relatively humidity in stages from a vacuum state until reaching the saturated steam pressure of water vapor at 25° C. and the amount of adsorption of water vapor was measured. From the obtained measurement results, an adsorption isotherm was drawn and the amounts of adsorption of water vapor at a relative humidity of 10% and 90% were read from the figure.

Table 1 shows the read water vapor amounts converted to the water vapor volume in the standard state adsorbed per g of the sample.

The particle size of the platinum particles was estimated by Scherrer's equation from the half value of the peak of platinum (111) in the powder X-ray diffraction spectrum of the catalyst obtained using an X-ray diffraction apparatus (made by Rigaku Corporation).

TABLE 1

| Catalyst No. | Type of carbon material | $V_{10}$ (ml/g) | $V_{90}$ (ml/g) | $V_{10}/V_{90}$ | Platinum particle size (nm) |
|---|---|---|---|---|---|
| 1 | A | 1.2 | 710 | 0.0017 | 3.6 |
| 2 | B | 2.8 | 725 | 0.0039 | 3.5 |
| 3 | C | 0.4 | 342 | 0.0012 | 3.8 |
| 4 | D | 1.9 | 653 | 0.0029 | 3.6 |
| 5 | E | 0.04 | 3.86 | 0.0104 | 5.2 |
| 6 | F | 0.8 | 420 | 0.0019 | 3.7 |
| 7 | G | 1.3 | 587 | 0.0022 | 3.7 |
| 8 | H | 3.2 | 1103 | 0.0029 | 3.4 |
| 9 | I | 1.8 | 1800 | 0.001 | 3.3 |
| 10 | J | 1.9 | 2200 | 0.0009 | 3.2 |
| 11 | K | 2.4 | 320 | 0.0075 | 4 |
| 12 | L | 1.8 | 715 | 0.0025 | 3.6 |
| 13 | M | 1.9 | 435 | 0.0044 | 3.7 |

Each of the Catalyst Nos. 1 to 13 was added in an argon stream to a 5% Nafion solution (made by Aldrich) to give a mass of solid content of Nafion of 3 times the mass of catalyst, this was lightly stirred, then the catalyst was crushed by ultrasonic waves. Butyl acetate was added while stirring to give a solid content concentration of the platinum catalyst and Nafion combined of 2 mass % to thereby prepare a catalyst layer slurry.

Each catalyst layer slurry was coated on one surface of a Teflon® sheet by spraying. This was dried in a 80° C. argon stream for 10 minutes then a 120° C. argon stream for 1 minute to obtain a solid polymer type fuel cell use electrode with each of the Catalyst Nos. 1 to 13 contained in the catalyst layer. Further, the spraying and other conditions were set so that the amount of use of platinum for the electrodes became 0.10 mg/cm². The amount of use of platinum was found by measuring the dried mass of the Teflon® sheet before and after spray coating and finding the difference.

Furthermore, from each obtained solid polymer type fuel cell use electrode, two pieces of a size of 2.5 cm square were cut. Two electrodes of the same type were placed sandwiching an electrolytic membrane (Nafion 112) so that the catalyst layers contacted the electrolytic membrane, then the assembly was hot pressed at 130° C. and 90 kg/cm² for 10 minutes. This was cooled down to room temperature, then only the Teflon® sheets were carefully peeled off, thereby leaving catalyst layers of the anode and the cathode fixed to the Nafion membrane. Furthermore, commercially available carbon cloth (EC-CC1-060 made by ElectroChem) was cut into two pieces of a size of 2.5 cm square. These were placed sandwiching the anode and cathode fixed to the Nafion membrane and were hot pressed at 130° C. and 50 kg/cm² for 10 minutes to thereby prepare 13 types of membrane electrode assemblies (MEA).

Each prepared MEA was assembled into a fuel cell measurement device and measured for cell performance. The cell performance was measured by changing the voltage across the cell terminals in stages from open voltage (usually 0.9 to 1.0V) to 0.2V and measuring the density of the current flowing when the voltage across the cell terminals was 0.8V. Further, as a durability test, the cell was held at the open voltage for 15 seconds, then the voltage across the cell terminals was held at 0.5V for 15 seconds. This cycle was repeated 4000 times. After this, the cell performance was measured in the same way as before the durability test. For the gas, air was supplied to the cathode and pure hydrogen to the anode to give rates of utilization of 50% and 80%. These gas pressures were adjusted to 0.1 Mpa by a back pressure valve provided downstream of the cell. The cell temperature was set to 70° C., then the supplied air and pure hydrogen were bubbled in distilled water warmed to 50° C. for humidification.

TABLE 2

| | | MEA | | | |
|---|---|---|---|---|---|
| Catalyst No. | MEA No. | Initial Cell performance (mA/cm²) | After durability test Cell performance (mA/cm²) | Deterioration rate (%) 100× (initial cell performance−cell performance after durability test)/ initial cell performance | Remarks |
| 1 | 1 | 160 | 145 | 9 | Test Piece 1 |
| 2 | 2 | 162 | 132 | 19 | Comp. Piece 1 |
| 3 | 3 | 135 | 124 | 8 | Comp. Piece 2 |
| 4 | 4 | 155 | 138 | 11 | Test Piece 2 |
| 5 | 5 | 127 | 122 | 4 | Comp. Piece 3 |
| 6 | 6 | 149 | 137 | 8 | Test Piece 3 |
| 7 | 7 | 151 | 138 | 9 | Test Piece 4 |
| 8 | 8 | 163 | 128 | 21 | Comp. Piece 4 |
| 9 | 9 | 158 | 140 | 11 | Test Piece 5 |
| 10 | 10 | 154 | 136 | 12 | Test Piece 6 |
| 11 | 11 | 138 | 115 | 17 | Comp. Piece 5 |
| 12 | 12 | 161 | 145 | 10 | Test Piece 7 |
| 13 | 13 | 150 | 132 | 12 | Test Piece 8 |

Table 2 shows the results of cell performances and the cell performances after the durability test of the MEAs. The MEAs using the Catalyst Nos. 1, 4, 6, 7, 9, 10, 12, and 13 of the present invention exhibited superior initial cell performances (initial cell performance ≥145 mA/cm²) and simultaneously maintained high cell performances even after the durability test (deterioration rate 12%). It is learned that the MEAs using the Catalyst Nos. 2 and 8 of the comparative pieces are superior in initial cell performances, but are low in cell performances after the durability test and are inferior in durability. Further, the MEAs using the Catalyst Nos. 3 and 5 of the comparative pieces are low in deterioration rate, which shows the difference between the initial cell performance and cell performance after the durability test, and superior in durability, but have initial cell performances inferior compared with the MEAs using the Catalyst Nos. 1, 4, 6, 7, 9, 10, 12, and 13 of the present invention. Further, the MEA using the Catalyst No. 11 of the comparative piece is inferior in initial cell performance and durability compared with the MEAs using the Catalyst Nos. 1, 4, 6, 7, 9, 10, 12, and 13 of the present invention. It is possible to exhibit both such superior initial cell performance and durability because the amount of adsorption of water vapor at a relative humidity of 90% is high, so the moisture retention is superior. Even under the above low humidification conditions, a high cell performance is exhibited. Furthermore, the amount of adsorption of water vapor at a relative humidity of 10% is low and the amount of adsorption of the functional groups promoting the oxidation loss of the carbon materials small, so a high durability is exhibited.

Example 2

Test Pieces Relating to Form of Fuel Cell According to Present Invention

Test pieces relating to the embodiments according to claims 4 to 8 of the present invention which make use of the high durability (resistance to oxidation loss) and moisture retention ability of the present catalyst and exhibit superior durability and power generation characteristics under various humidification conditions are shown below. First, test pieces corresponding to claim 4 and claim 5 will be shown below, but the present invention is not limited to the embodiments of these test pieces.

<Measurement of Physical Properties of Various Carbon Materials Used for Evaluation>

In showing the test pieces of the present invention, 11 types of carbon materials "a" to "k" were prepared as carbon materials used for the catalyst-carrying carbon material, gas-diffusing carbon material, and conductivity aid. Table 3 (types of carbon materials and their physical properties) show the various physical properties of various types of carbon materials.

Note that, for the nitrogen adsorption specific surface area, a sample which was vacuum dried at 120° C. was measured using an automatic specific surface area measurement device (BELSORP36 made by Bel Japan) in nitrogen gas to determine the specific surface area $S_{BET}$ by the one-point method based on the BET method. Further, for the t-plot analysis, an analysis program attached to the apparatus was used to calculate the values of the physical properties $S_{total}$ and $S_{micro}$. The oxygen content is the element analysis value. For the amount of adsorption of water vapor, a constant volume type water vapor adsorption apparatus (BELSORP18 made by Bel Japan) was used for measurement. A sample pretreated for deaeration at 120° C. and 1 Pa or less for 2 hours was held in a 25° C. constant temperature tank. Water vapor was gradually supplied from a vacuum state to the saturated steam pressure of water vapor at 25° C. so as to change the relative humidity in steps. The amount of adsorption of water vapor was measured there. From the obtained measurement results, an adsorption isotherm was drawn. The amount of adsorption of water vapor at a relative humidity of 90% was read from the graph. Table 1 shows the amount of water vapor read converted to the volume of water vapor in the standard state adsorbed per g of the sample. The DBP oil absorption was determined by converting the amount of addition of DBP at the time of 70% of the maximum torque to the DBP oil absorption per 100 g of sample using an Absorptometer (made by Brabender).

TABLE 3

| Type | Specific surface area $S_{BET}$ m²/g | Total surface area $S_{total}$ m²/g | Micropore surface area m²/g | $S_{micro}/S_{total}$ | Amount of adsorption of water vapor ml/g | DBP oil absorption X ml/100 g | $X/S_{BET}$ |
|---|---|---|---|---|---|---|---|
| a | 70 | 70 | 11 | 0.16 | 4 | 170 | 2.43 |
| b | 230 | 220 | 130 | 0.59 | 61 | 235 | 1.07 |
| c | 400 | 450 | 125 | 0.28 | 48 | 95 | 0.21 |
| d | 1130 | 1260 | 770 | 0.61 | 34 | 50 | 0.04 |
| e | 1260 | 1250 | 210 | 0.17 | 340 | 540 | 0.43 |

TABLE 3-continued

| Type | Specific surface area $S_{BET}$ m²/g | Total surface area $S_{total}$ m²/g | Micropore surface area m²/g | $S_{micro}/S_{total}$ | Amount of adsorption of water vapor ml/g | DBP oil absorption X ml/100 g | $X/S_{BET}$ |
|---|---|---|---|---|---|---|---|
| f | 1330 | 1340 | 465 | 0.35 | 42 | 25 | 0.02 |
| g | 1360 | 1320 | 260 | 0.20 | 57 | 30 | 0.02 |
| h | 1360 | 1350 | 850 | 0.63 | 290 | 430 | 0.32 |
| i | 1670 | 1600 | 1560 | 0.98 | 730 | 55 | 0.03 |
| j | 2100 | 2270 | 2200 | 0.97 | 620 | 60 | 0.03 |
| k | 2010 | 2130 | 2100 | 0.99 | 650 | 40 | 0.02 |

Note that the carbon materials "h", "i", "j", and "k" used as the catalyst-carrying carbon material A were measured for amount of adsorption of water vapor. The results are examined and summarized in Table 4. For the method of measurement, the same apparatus and method were used for measurement and evaluation as with the above test pieces.

TABLE 4

| Catalyst No. | Type of carbon material | $V_{10}$ (ml/g) | $V_{90}$ (ml/g) | $V_{10}/V_{90}$ | Platinum particle size (nm) |
|---|---|---|---|---|---|
| H | h | 0.27 | 290 | 0.0009 | 3.3 |
| I | i | 2.8 | 730 | 0.0038 | 3.4 |
| J | j | 0.96 | 620 | 0.0015 | 3.2 |
| K | k | 1.9 | 650 | 0.0029 | 3.3 |

<Method of Preparation of Catalyst-Carrying Carbon Material Carrying Platinum>

In a chloroplatinic acid aqueous solution, one type of carbon material selected from those in Table 1 was dispersed as the catalyst-carrying carbon material. The mixture was warmed to 50° C. While stirring, hydrogen peroxide water was added, then an $Na_2S_2O_4$ aqueous solution was added to obtain a catalyst precursor. This catalyst precursor was filtered, rinsed, dried, then reduced in a 100% $H_2$ stream at 300° C. for 3 hours to prepare a platinum catalyst comprised of a catalyst-carrying carbon material carrying 50 mass % of platinum metal.

<Standard Method of Preparation of Coating Ink>

Two types of carbon materials were selected as the catalyst-carrying carbon material A and the catalyst-carrying carbon material B. The procedure of the above <Preparation of Catalyst Carrier Carbon Material Carrying Platinum Metal> was used to carry platinum metal. The two types of platinum catalyst were taken in a container. To this, a 5% Nafion solution (DE521 made by DuPont) was added. The mixture this was lightly stirred, then the catalyst was crushed by ultrasonic waves. Furthermore, while stirring, butyl acetate was added to give a solid concentration of the platinum metal, catalyst-carrying carbon materials A and B, and Nafion of 2 mass % and thereby prepare a catalyst aggregation ink comprised of two types of platinum catalysts and Nafion (electrolyte) aggregated. For the various types of materials, unless indicated otherwise, Nafion was mixed in 1.5 parts by mass with respect to the total 1 part by mass of the catalyst-carrying carbon materials A and B.

Further, in a separate container, one type of carbon material selected from those of Table 1 was taken as the gas-diffusing carbon material. Butyl acetate was added to give a concentration of the carbon material of 2 mass %. The carbon material was crushed by ultrasonic waves to thereby prepare a gas-diffusing carbon material aggregation ink in which the gas-diffusing carbon material was aggregated.

Next, the catalyst aggregation ink and the gas-diffusing carbon material aggregation ink were mixed to prepare a coating ink with a solid content concentration of 2 mass %.

<Method of Preparation of Catalyst Layers>

The prepared coating ink was sprayed on a Teflon® sheet, then dried in argon at 80° C. for 10 minutes, then in argon at 120° C. for 60 minutes to prepare a catalyst layer. The platinum basis weight of the catalyst layer was determined by cutting the prepared catalyst layer on the Teflon® sheet to a square shape of 3 cm square, measuring the mass, then scraping off the catalyst layer by a scraper, measuring the mass of the Teflon® sheet after that, calculating the mass of the catalyst layer from the difference from the previous mass, and calculating the basis weight by calculation from the ratio of the platinum in the solid content in the catalyst ink. The amount of spray was adjusted to give a platinum basis weight of 0.10 mg/cm².

When the catalyst layer is a two-layer structure of an inner layer and outer layer, first an outer layer-use coating ink is sprayed on the Teflon® sheet, then is dried in argon at 80° C. for 10 minutes and cooled to room temperature to form the outer layer catalyst layer. Next, an inner layer-use coating ink is sprayed on the outer layer catalyst layer, dried in argon at 80° C. for 10 minutes, then dried in argon at 120° C. for 60 minutes, to thereby prepare a catalyst layer having a two-layer structure of an inner layer and outer layer. For the platinum basis weight of the catalyst layer and the ratio of the inner layer and outer layer, the same method as the above was used to calculate the platinum basis weight after preparation of the outer layer catalyst layer and after preparation of the inner layer catalyst layer. The amount of spray was adjusted to give a platinum basis weight of 0.10 mg/cm² and the targeted ratio of the inner layer and outer layer.

<Preparation of MEA>

The prepared catalyst layers were used to prepare an MEA (membrane electrode assembly).

A Nafion membrane (N112 made by DuPont) was cut into a square shape of 6 cm square. The catalyst layers coated on the Teflon® sheets were cut by a cutter knife to square shapes of 2.5 cm square. These catalyst layers were placed as the anode and cathode at the centers of the Nafion membrane without deviation, then hot pressed at 120° C. and 100 kg/cm² for 10 minutes. The assembly was cooled down to room temperature, then, at both the anode and cathode, only the Teflon® sheets were carefully peeled off whereby the catalyst layers of the anode and the cathode were left fixed to the Nafion membrane. Next, as gas diffusion layers, commercially available carbon cloth (LT1200W made by E-TEK) was cut into square shapes of 2.5 cm square. These were accurately placed sandwiching the anode and cathode, then the assembly was pressed at 120° C. and 50 kg/cm² for 10 minutes to prepare an MEA. Note that the mass of the fixed catalyst layers was found from the difference of the mass of the Teflon® sheets with the catalyst layers before pressing and the mass of the Teflon® sheets after pressing and peeling were found. The platinum basis weight was calculated from the mass ratio of the compositions of the catalyst layers and was confirmed to be 0.1 mg/cm$^2$.

<Conditions for Evaluation of Fuel Cell Performance>

Each prepared MEA was assembled into a cell and evaluated for fuel cell performance by a fuel cell measurement device by the next procedure.

First, the performance was evaluated using the following conditions as representative conditions of a "high humidification, high load". As the gas, air was supplied to the cathode and pure hydrogen was supplied to the anode to give rates of utilization of 35% and 70%. The gas pressures were adjusted by a back pressure valve provided downstream of the cell to 0.1 MPa. The cell temperature was set to 80° C. The supplied air and pure hydrogen were bubbled in distilled water warmed to 80° C. for humidification. Under such conditions, the cell was supplied with the gases, then the load was gradually increased to 1000' mA/cm$^2$. The load was fixed at 1000 mA/cm$^2$. The volume across the terminals of the cell after the elapse of 60 minutes was recorded as the "high humidification, high load".

Next, the performance was evaluated using the following conditions as representative conditions of a "low humidification, low load". As the gas, air was supplied to the cathode and pure hydrogen was supplied to the anode to give rates of utilization of 35% and 70%. The gas pressures were adjusted by a back pressure valve provided downstream of the cell to 0.1 MPa. The cell temperature was set to 80° C. The supplied air and pure hydrogen were bubbled in distilled water warmed to 80° C. for humidification. Under such conditions, the cell was supplied with the gases, then the load was gradually increased to 1000 mA/cm$^2$. The load was fixed at 1000 mA/cm$^2$. The volume across the terminals of the cell after the elapse of 10 minutes was recorded as the "low humidification, low load" performance.

Furthermore, as conditions for "evaluation of the durability", the following were employed. As the gas, air was supplied to the cathode and pure hydrogen was supplied to the anode to give rates of utilization of 35% and 70%. The gas pressures were adjusted by a back pressure valve provided downstream of the cell to 0.1 MPa. The cell temperature was set to 80° C. The supplied air and pure hydrogen were bubbled in distilled water warmed to 50° C. for humidification. Under such conditions, the cell was supplied with the gases, then the load was gradually increased to 1000 mA/cm$^2$. The load was fixed at 1000 mA/cm$^2$. After the elapse of 30 minutes, the load was lowered to 100 mA/cm$^2$. The voltage across the cell terminals after the elapse of 10 minutes was made the low humidification, low load performance before deterioration. After this, the voltage across the cell terminals was held at the open voltage for 15 seconds, then the voltage across the cell terminals was held at 0.5V for 15 seconds. This cycle was performed 4000 times. After this, the low humidification, low load performance was measured under the same conditions as before the durability test. This was defined as the low humidification, low load performance after deterioration. The low humidification, low load performance after deterioration/low humidification, low load performance before deterioration× 100 was used as a parameter for evaluation of the durability as the "deterioration rate (%)".

<Effect of Two-Type Mixed Catalyst, Presence of Aggregation Structure, and Effect of Missing Carbon Material>

The carbon materials "a", "e", and "j" with the physical properties shown in Tables 3 and 4 were used to form catalyst layers which were then compared for performance as follows. Catalyst layers using the catalyst-carrying carbon material defined by the present invention for the catalyst-carrying carbon material A such as shown by "j" of Table 4 and selecting "e" of Table 3 for the catalyst-carrying carbon material B and "a" of Table 3 for the gas-diffusing carbon material were used for comparison.

Note that, for the Test Piece 9, a catalyst-carrying carbon material A which carries a catalyst ingredient, a catalyst-carrying carbon material B which carries a catalyst ingredient, a gas-diffusing carbon material, and an electrolytic material comprised of a 5% Nafion solution (DE521 made by DuPont) were mixed. The mixture was diluted by ethanol to prepare a coating ink having a solid content concentration of 2 mass %, the carbon material was crushed by ultrasonic waves, then the result was uniformly mixed to prepare a coating ink. This was used to prepare a catalyst layer by the method described in <Method of Preparation of Catalyst Layer>.

Further, for each of the Test Pieces 10, 11, and 12 and Comparative Pieces 6 and 7, a coating ink prepared in accordance with the above <Standard Method of Preparation of Coating Ink> was used to prepare the catalyst layer. For the Test Piece 10, a catalyst layer comprised of a catalyst aggregation phase comprised of a catalyst-carrying carbon material A, a catalyst-carrying carbon material B, and electrolytic material and of a gas-diffusing carbon material aggregation phase and structured with the gas-diffusing carbon material aggregation phase dispersed in the catalyst aggregation phase was prepared. Note that, for the Test Pieces 11 and 12 and Comparative Pieces 6 and 7, catalyst layers missing one or more of the three types of carbon materials compared with the Test Piece 10 were prepared.

The power generation performances when using these catalyst layers as cathodes were compared. Note that, for the anodes, the catalyst layer of Test Piece 10 was used in each case.

TABLE 5

| Cathode catalyst layer | Catalyst-carrying carbon material A | Catalyst-carrying carbon material B | A/(A + B) | Gas-diffusing carbon material | Content of gas-diffusing carbon material | High humidification, high load | Low humidification, low load | Deterioration rate (%) | Aggregation phase two-phase structure |
|---|---|---|---|---|---|---|---|---|---|
| Test Piece 9 | j | e | 0.5 | a | 10% | 0.401 V | 0.703 V | 9 | None |
| Test Piece 10 | j | e | 0.5 | a | 10% | 0.613 V | 0.769 V | 9 | Yes |
| Test Piece 11 | j | e | 0.5 | None | 0.1 | <0.3 | 0.661 | 10 | Yes |
| Test Piece 12 | j | None | 0.5 | a | 0.1 | <0.3 | 0.659 | 10 | Yes |
| Comp. Piece 6 | None | e | 0.5 | a | 0.1 | 0.34 | 0.624 | 12 | Yes |
| Comp. Piece 7 | None | e | 0.5 | None | 0.1 | <0.3 | 0.584 | 12 | Yes |

Among the catalyst layers prepared in the above comparison of performance, the catalyst layers of the Test Piece 10 which has the two-phase structure of aggregation phases and the Test Piece 9 which does not have such a two-phase structure were examined for cross-sectional structure by the following method.

For the observed samples, the MEAs used in the comparison of the performance were evaluated for performance, then were taken out from the cells and tweezers were used to carefully peel off the gas diffusion layers. Next, the MEAs from which the gas diffusion layers were peeled off were cut by a cutter knife into sizes of 5 mm square. Each piece was fixed by carbon tape to the holder of a cryomicrotome so that the catalyst layer of the cathode could be cut. The prepared holder was set in the cryomicrotome. For the knife, a diamond trimming knife was set. At this time, the diamond trimming knife was set at an angle of about 10 degrees with respect to the direction of advance of the knife so as to enable the catalyst layer to be cut at a slant. The cutting temperature was set to −90° C. The piece was cut in the depth direction of the catalyst layer by a thickness of 50 nm per cut for at least 100 cuts to prepare a cut cross-section of the catalyst layer. Each catalyst layer with such a prepared cut cross-section was set together with the holder in an electron microscope holder and examined by a secondary electron image and reflected electron image at a power of 10,000×. The catalyst layer of the Test Piece 9 was observed to have a uniformly bright contrast in the reflected electron image other than at locations where it is presumed from the secondary electron image that the electrolytic material forms masses. No aggregation phase of the carbon material where no catalyst ingredient is carried (gas-diffusing carbon material aggregation phase) could be seen. As opposed to this, at the catalyst layer of the Test Piece 10, in the locations where it can be judged that there is clearly a carbon material in the secondary electron image, locations with a dark contrast in the reflected electron image, that is, aggregation phases of the carbon material where no catalyst ingredient is carried (gas-diffusing carbon material aggregation phases), could be observed distributed in island shapes. For more quantitative discrimination, a reflected electron image is obtained as electronic information by a power of 10,000×, a resolution of 272 DPI×272 DPI or more, and a luminance of 256 shades. The luminance of the obtained image is binarized using image analyzing software to display the range from dark to the 110th shade by black and the range from the 111th shade to bright to the 256th shade by white.

Next, the black points are dilated once to confirm the adjoining points. Furthermore, fill-in processing is performed to fill in the blank parts in the range and make the range appear to be the same. Finally, contraction is performed to return the dilated parts and clarify, the targeted range. After this, the circle equivalent diameter of each black part is calculated from the area of each black part and parts of less than 300 nm are all cut. If counting the number of black parts, among the remaining black parts, where there is a carbon material in the secondary electron image of the same field, there were 11. Furthermore, even if cutting the black parts with a circle equivalent diameter of 500 nm or less, if counting the number of black parts, among the remaining black parts, where there is a carbon material in the secondary electron image of the same field, there were three. Therefore, it can be confirmed that the catalyst layer of the Test Piece 10 has the preferable structure of the present invention. As shown in Table 4, compared with the Test Piece 9, it has superior characteristics under both high humidification, high load conditions and low humidification, low load conditions.

Further, as shown in Table 5, the Test Piece 10 of the present invention using the catalyst-carrying carbon material A, catalyst-carrying carbon material B, and gas-diffusing carbon material exhibited superior characteristics under both high humidification, high load conditions and low humidification, low load conditions compared with the Test Pieces 11 and 12 and the Comparative Pieces 6 and 7 which were missing one or more of the three types of carbon materials. Further, the Test Pieces 11 and 12 were confirmed to be clearly higher in deterioration rate compared with the Comparative Pieces 6 and 7.

Example 3

Effect of Catalyst-Carrying Carbon Material A in Two-Type Mixed Catalyst (Claim 5)

As shown in Table 6, using the carbon materials of "a" to "d" and "f" to "k" of Table 1 for the catalyst-carrying carbon material A, using "e" of Table 1 for the catalyst-carrying carbon material B, and using "a" of Table 1 for the gas-diffusing carbon material, various types of catalyst layers having different types of catalyst-carrying carbon materials A were prepared using coating inks prepared based on the <Standard Method of Preparation of Coating Ink> so as to give a two-phase structure of the catalyst aggregation phase and the gas-diffusing carbon material aggregation phase. The power generation performances when using these catalyst layers as the cathodes were compared. Note that, for the anodes, the catalyst layer of the Test Piece 10 was used.

TABLE 6

| Cathode catalyst layer | Catalyst-carrying carbon material A | Catalyst-carrying carbon material B | A/(A + B) | Gas-diffusing carbon material | Content of gas-diffusing carbon material | High humidification, high load | Low humidification, low load | Deterioration rate (%) | Aggregation phase, two-phase structure |
|---|---|---|---|---|---|---|---|---|---|
| Comp. Piece 8 | a | e | 0.5 | a | 10% | 0.623 V | 0.612 V | 11 | Yes |
| Comp. Piece 9 | b | e | 0.5 | a | 10% | 0.597 V | 0.633 V | 12 | Yes |
| Comp. Piece 10 | c | e | 0.5 | a | 10% | 0.465 V | 0.532 V | 13 | Yes |
| Comp. Piece 11 | d | e | 0.5 | a | 10% | 0.583 V | 0.748 V | 15 | Yes |
| Comp. Piece 12 | f | e | 0.5 | a | 10% | 0.570 V | 0.646 V | 15 | Yes |
| Comp. Piece 13 | g | e | 0.5 | a | 10% | 0.549 V | 0.623 V | 14 | Yes |
| Comp. Piece 14 | h | e | 0.5 | a | 10% | 0.599 V | 0.765 V | 13 | Yes |
| Comp. Piece 15 | i | e | 0.5 | a | 10% | 0.608 V | 0.782 V | 13 | Yes |
| Test Piece 10 | j | e | 0.5 | a | 10% | 0.613 V | 0.769 V | 9 | Yes |
| Test Piece 13 | k | e | 0.5 | a | 10% | 0.583 V | 0.757 V | 10 | Yes |

As shown in Table 6, the Test Pieces 10 and 13 using "j" and "k" corresponding to the present catalyst for the catalyst-carrying carbon material A exhibited superior performance in high humidification, high load characteristic, low humidification, low load characteristic, and durability (deterioration rate). In particular, the Test Piece 10 satisfying claims 1 and 2 exhibited extremely superior characteristics.

As opposed to this, Comparative Pieces 8 to 15 using a carbon material with a specific surface area $S_{BET}$ evaluated by BET of less than 1000 m²/g or a ratio $S_{micro}/S_{total}$ of the micropore surface area $S_{micro}$ and the total surface area $S_{total}$ of less than 0.5 as the catalyst-carrying carbon material A could not achieve both high humidification, high load characteristic and low, humidification, low load characteristic and were overall poor in deterioration rate compared with the test pieces. In particular, if using a TEM to examine the Pt catalyst of the Comparative Pieces 8 to 10 using a material with a specific surface area $S_{BET}$ evaluated by BET of less than 1000 m²/g for the catalyst-carrying carbon material A, the carried Pt particles aggregated and became massive in size. In parts, there were particles of a particle size over 10 nm. If using a TEM to examine the Pt catalyst of the Test Pieces 10 and 13, no Pt particles with a particle size over 5 nm could be observed.

Example 4

Effect of Catalyst-Carrying Carbon Material B in Two-Type Mixed Catalyst (Claim 5)

As shown in Table 7, using "j" of Tables 3 and 4 of the present catalyst for the catalyst-carrying carbon material A, using the various carbon materials of "a" to "i" of Table 3 for the catalyst-carrying carbon material B, and using "a" of Table 3 for the gas-diffusing carbon material, various types of catalyst layers having different types of the catalyst-carrying carbon material B were prepared using coating inks prepared based on the <Standard Method of Preparation of Coating Ink> so as to give a two-phase structure of the catalyst aggregation phase and the gas-diffusing carbon material aggregation phase. The power generation performances when using these catalyst layers as the cathodes were compared. Note that, for the anodes, the catalyst layer of the Test Piece 10 was used.

As shown in Table 7, the Test Piece 10, the Test Pieces 14 to 16, and the Test Piece 20 using the catalyst-carrying carbon material B of the present invention with a ratio $X/S_{BET}$ of the DBP oil absorption X ml/100 g and the specific surface area $S_{BET}$ evaluated by BET of 0.2 to 3.0 exhibited superior performance in high humidification, high load characteristic, low humidification, low load characteristic, and durability (deterioration rate). As opposed to this, 17, 18, 19, and 21 using carbon materials with a ratio $X/S_{BET}$ of the DBP oil absorption X ml/100 g and the specific surface area $S_{BET}$ evaluated by BET outside the range of 0.2 to 3.0 as the catalyst-carrying carbon material B were generally excellent in deterioration rate, but achievement of both high humidification, high load characteristic and low humidification, low load characteristic was difficult.

Example 5

Effect of (A/(A+B)) in Two-Type Mixed Catalyst (Claim 5)

As shown in Table 8, using "j" of Tables 3 and 4 of the present catalyst for the catalyst-carrying carbon material A, using "e" of Table 3 for the catalyst-carrying carbon material B, and using "a" of Table 3 for the gas-diffusing carbon material, various types of catalyst layers having a changed mass ratio A/(A+B) of the catalyst-carrying carbon material A and the catalyst-carrying carbon material B were prepared using coating inks prepared based on the <Standard Method of Preparation of Coating Ink> so as to give a two-phase structure of the catalyst aggregation phase and the gas-diffusing carbon material aggregation phase. The power generation performances when using these catalyst layers as the cathodes were compared.

Further, for a catalyst layer having a mass ratio A/(A+B) of the catalyst-carrying carbon material A and catalyst-carrying carbon material B of 0.70, the content of the gas-diffusing carbon material in the catalyst layer was changed and the power generation performances were compared. Note that, for the anode, the catalyst layer of the Test Piece 10 was used.

TABLE 7

| Cathode catalyst layer | Catalyst-carrying carbon material A | Catalyst-carrying carbon material B | A/(A + B) | Gas-diffusing carbon material | Content of gas-diffusing carbon material | High humidification, high load | Low humidification, low load | Deterioration rate (%) | Aggregation phase, two-phase structure |
|---|---|---|---|---|---|---|---|---|---|
| Test Piece 14 | j | a | 0.5 | a | 10% | 0.642 V | 0.756 V | 8 | Yes |
| Test Piece 15 | j | b | 0.5 | a | 10% | 0.630 V | 0.769 V | 9 | Yes |
| Test Piece 16 | j | c | 0.5 | a | 10% | 0.574 V | 0.731 V | 11 | Yes |
| Test Piece 17 | j | d | 0.5 | a | 10% | 0.342 V | 0.606 V | 11 | Yes |
| Test Piece 10 | j | e | 0.5 | a | 10% | 0.613 V | 0.769 V | 9 | Yes |
| Test Piece 18 | j | f | 0.5 | a | 10% | 0.337 V | 0.623 V | 11 | Yes |
| Test Piece 19 | j | g | 0.5 | a | 10% | 0.364 V | 0.675 V | 11 | Yes |
| Test Piece 20 | j | h | 0.5 | a | 10% | 0.641 V | 0.765 V | 8 | Yes |
| Test Piece 21 | j | i | 0.5 | a | 10% | 0.411 V | 0.587 V | 11 | Yes |

TABLE 8

| Cathode catalyst layer | Catalyst-carrying carbon material A | Catalyst-carrying carbon material B | A/(A + B) | Gas-diffusing carbon material | Content of gas-diffusing carbon material | High humidification, high load | Low humidification, low load | Deterioration rate (%) | Aggregation phase, two-phase structure |
|---|---|---|---|---|---|---|---|---|---|
| Test Piece 22 | j | e | 0.1 | a | 10% | 0.628 V | 0.659 V | 10 | Yes |
| Test Piece 23 | j | e | 0.2 | a | 10% | 0.638 V | 0.729 V | 9 | Yes |
| Test Piece 24 | j | e | 0.35 | a | 10% | 0.617 V | 0.748 V | 9 | Yes |
| Test Piece 10 | j | e | 0.5 | a | 10% | 0.613 V | 0.769 V | 9 | Yes |
| Test Piece 25 | j | e | 0.7 | a | 2% | 0.516 V | 0.742 V | 9 | Yes |
| Test Piece 26 | j | e | 0.7 | a | 5% | 0.589 V | 0.800 V | 9 | Yes |
| Test Piece 27 | j | e | 0.7 | a | 10% | 0.611 V | 0.810 V | 9 | Yes |
| Test Piece 28 | j | e | 0.7 | a | 20% | 0.650 V | 0.787 V | 9 | Yes |
| Test Piece 29 | j | e | 0.7 | a | 30% | 0.653 V | 0.749 V | 9 | Yes |
| Test Piece 30 | j | e | 0.7 | a | 40% | 0.556 V | 0.640 V | 9 | Yes |
| Test Piece 31 | j | e | 0.85 | a | 10% | 0.593 V | 0.802 V | 9 | Yes |
| Test Piece 32 | j | e | 0.95 | a | 10% | 0.552 V | 0.796 V | 10 | Yes |
| Test Piece 33 | j | e | 0.98 | a | 10% | 0.469 V | 0.806 V | 10 | Yes |

Even if the mass ratio A/(A+B) of the catalyst-carrying carbon material A and the catalyst-carrying carbon material B was changed, the deterioration rate did not change much. However, the Test Piece 10 and the Test Pieces 23 to 32 with an A/(A+B) of 0.2 to 0.95, compared with the Test Piece 22 with a mass ratio A/(A+B) of less than 0.2 or the Test Piece 33 with a mass ratio A/(A+B) of over 0.95, exhibited superior performance under both high humidification, high load conditions and low humidification, low load conditions. Further, if comparing the Test Pieces 25 to 30 with a mass ratio A/(A+B) of the catalyst-carrying carbon material A and the catalyst-carrying carbon material B of 0.70, the Test Pieces 26 to 29 with a content of the gas-diffusing carbon material in the catalyst layer of 3 mass % to 30 mass % exhibited superior performance under both high humidification, high load conditions and low humidification, low load conditions. In particular, the Test Pieces 26 to 28 with a content of the gas-diffusing carbon material in the catalyst layer of 5 mass % to 25 mass % exhibited balanced characteristics under both high humidification, high load conditions and low humidification, low load conditions.

Example 6

Effect of Two-Phase Catalyst (Claim 6)

Below, test pieces where the catalyst layer is made a multilayer catalyst layer will be explained, but the present invention is not limited to the following test pieces.

The carbon material which is used for these test pieces was obtained as follows using the various types of carbon materials of Table 3 and Table 4 in the same way as the above test pieces. The platinum catalyst used was the same one as in the above performance evaluations 3 to 5.

<Standard Method of Preparation of Coating Ink>

One type of carbon material each was selected as the catalyst-carrying carbon material A or B. The procedure of the above <Preparation of Catalyst Carrier Carbon Material Carrying Platinum Metal> was used to carry platinum metal. The prepared platinum catalyst was taken in a container. In the case of the coating ink of the inner layer catalyst layer, one type of conductivity aid carbon material was selected from Table 1 and added to the container. To this, a 5% Nafion solution (DE521 made by DuPont) was added. The mixture this was lightly stirred, then the catalyst was crushed by ultrasonic waves. Furthermore, while stirring, butyl acetate was added to give a solid concentration of the platinum metal, catalyst-carrying carbon material A or B, in the case of the inner layer, conductivity aid carbon material, and Nafion of 2 mass % and thereby prepare a catalyst aggregation ink comprised of two types of platinum catalysts and Nafion (electrolyte) aggregated. Unless particularly indicated otherwise, Nafion was mixed in by a ratio of 1.5 parts by mass with respect to 1 part by mass of the total of the catalyst-carrying carbon material A and conductivity aid carbon material in the case of the inner layer and with respect to 1 part by mass of the catalyst-carrying carbon material B in the case of the outer layer.

Further, in a separate container, as a gas-diffusing carbon material, one type of the material selected from the carbon materials of Table 1 was taken. Butyl acetate was added to give a concentration of carbon material of 2 mass %. The carbon material was crushed by ultrasonic waves to prepare a gas-diffusing carbon material aggregation ink in which the gas-diffusing carbon material is aggregated.

Next, the catalyst aggregation ink and the gas-diffusing carbon material aggregation ink were mixed to prepare coating ink with a solid content concentration of 2 mass %.

<Method of Preparation of Catalyst Layer>

First, the outer layer-use coating ink was sprayed on a Teflon® sheet, then dried in argon at 80° C. for 10 minutes and cooled down to room temperature to form an outer layer catalyst layer. Next, the inner layer-use coating ink was sprayed on the outer layer catalyst layer, dried in argon at 80° C. for 10 minutes, then dried in argon at 120° C. for 60 minutes to obtain a catalyst layer having a two-layer structure of an inner layer and outer layer.

The platinum basis weight of the catalyst layer and the ratio of the inner layer and outer layer were determined, after preparation of the outer layer catalyst layer and after preparation of the inner layer catalyst layer, by cutting the prepared catalyst layer on the Teflon® sheet to a square shape of 3 cm square, measuring its mass, then scraping off the catalyst layer by a scraper, measuring the mass of the Teflon® sheet after that, calculating the mass of the catalyst layer peeled off from the difference from the previous mass, and calculating the platinum basis weight from the ratio of the platinum in the solid content in the catalyst ink. The amount of spray was adjusted to give a platinum basis weight of 0.10 mg/cm² and the targeted ratio of the inner layer and outer layer.

<Preparation of MEA>

The prepared catalyst layer was used to prepare an MEA (membrane electrode assembly).

A Nafion membrane (N112 made by DuPont) was cut into a square shape of 6 cm square. Catalyst layers coated on Teflon® sheets were cut by a cutter knife to square shapes of 2.5 cm square. These catalyst layers were placed as the anode and cathode at the centers of the Nafion membrane without deviation, then hot pressed at 120° C. and 100 kg/cm² for 10 minutes. The assembly was cooled down to room temperature, then, at both the anode and cathode, only the Teflon® sheets were carefully peeled off, whereby the catalyst layers of the anode and the cathode were left fixed to the Nafion membrane. Next, as gas diffusion layers, commercially available carbon cloth (LT1200W made by E-TEK) was cut into square shapes of 2.5 cm square. These were accurately placed sandwiching the anode and cathode, then the assembly was pressed at 120° C. and 50 kg/cm² for 10 minutes to prepare an MEA. Note that the mass of the fixed catalyst layers was found from the difference of the mass of the Teflon® sheets with the catalyst layers before pressing and the mass of the Teflon® sheets after pressing and peeling. The platinum basis weight was calculated from the mass ratio of the compositions of the catalyst layers and was confirmed to be 0.1 mg/cm².

<Conditions for Evaluation of Fuel Cell Performance>

The prepared MEA was evaluated by measuring the "high humidification, high load", "low humidification, low load", and "deterioration rate" under the same conditions as the above.

<Effect of Two-Phase Catalyst (Claim 6)>

First, as shown in Table 9, using a two-layer structure catalyst layer selecting a catalyst-carrying carbon material A of "j" of Table 3 and Table 4, a conductivity aid carbon material Y of "e" of Table 3, and a gas-diffusing carbon material of "a" of Table 3 for the catalyst layer of the inner layer and selecting a catalyst-carrying carbon material B of "h" of Table 1 and Table 4 and a gas-diffusing carbon material of "a" of Table 3 for the catalyst layer of the outer layer, a Comparison was made.

Note that, for the Test Piece 34, a catalyst-carrying carbon material A of "j" of Table 3 and Table 4, a catalyst-carrying carbon material B of "h" of Table 3 and Table 4, a conductivity aid carbon material Y of "e" of Table 3, a gas-diffusing carbon material of "a" of Table 3, and an electrolytic material of a 5% Nafion solution (DE521 made by DuPont) were mixed, the mixture was diluted by ethanol to give a solid content concentration of 2 mass %, the carbon material was crushed by ultrasonic waves, then the ingredients were uniformly mixed to prepare a coating ink. This was used to prepare a catalyst layer of a single layer with no inner layer or outer layer and not having an aggregation phase structure. This was similarly evaluated.

Further, for the Test Piece 35, a catalyst-carrying carbon material A of "j" of Table 3 and Table 4, a conductivity aid carbon material Y of "e" of Table 3, a gas-diffusing carbon material of "a" of Table 3, and an electrolytic material of a 5% Nafion solution (DE521 made by DuPont) were mixed, the mixture was diluted by ethanol to give a solid content concentration of 2 mass %, the carbon material was crushed by ultrasonic waves, then the ingredients were uniformly mixed to prepare an inner layer-use coating ink, while a catalyst-carrying carbon material B of "h" of Table 3 and Table 4, a gas-diffusing carbon material of "a" of Table 3, and an electrolytic material of a 5% Nafion solution (DE521 made by DuPont) were mixed, the mixture was diluted by ethanol to give a solid content concentration of 2 mass %, the carbon material was crushed by ultrasonic waves, then the ingredients were uniformly mixed to prepare an outer layer-use coating ink. For the catalyst layer, these two types of coating ink were used to prepare a two-layer structure catalyst layer not having an aggregation phase structure by the method described in the <Method of Preparation of Catalyst Layer>. This was similarly evaluated.

Furthermore, for the Test Pieces 36 to 42, an inner layer-use coating ink and outer layer-use coating ink were prepared based the above <Standard Method of Preparation of Coating Ink>. The catalyst layers were prepared using these two types of coating ink by the method described in <Method of Preparation of Catalyst Layer>. Two-layer structure catalyst layers, each consisting of an inner layer catalyst layer comprised of a catalyst aggregation phase comprising a catalyst-carrying carbon material A which carries a catalyst ingredient, a conductivity aid carbon material, and an electrolytic material and of a gas-diffusing carbon material aggregation phase, structured with the gas-diffusing carbon material aggregation phase dispersed in the catalyst aggregation phase, and consisting of an outer layer catalyst layer comprised of a catalyst aggregation phase comprising a catalyst-carrying carbon material B which carries a catalyst ingredient and an electrolytic material and of a gas-diffusing carbon material aggregation phase, structured with the gas-diffusing carbon material aggregation phase dispersed in the catalyst aggregation phase, were prepared and used for evaluation. Note that, the Test Pieces 37 to 42 used catalyst layers missing one or more of the carbon materials.

The power generation performances when using these catalyst layers as the cathode were compared. Note that, for the anode, the catalyst layer of the Test Piece 10 was used in all cases.

TABLE 9

| Cathode catalyst layer | Inner layer | | | | | Outer layer | | |
|---|---|---|---|---|---|---|---|---|
| | Catalyst-carrying carbon material A | Conductivity aid carbon material Y | Y/(A + Y) | Gas diffusing carbon material | Content of gas-diffusing carbon material | Catalyst-carrying carbon material B | Gas-diffusing carbon material | Gas-diffusing carbon material |
| Test Piece 34 | j | e | 0.2 | a | 10% | h | a | 10% |
| Test Piece 35 | j | e | 0.2 | a | 10% | h | a | 10% |
| Test Piece 36 | j | e | 0.2 | a | 10% | h | a | 10% |
| Test Piece 37 | j | None | 0 | a | 10% | h | a | 10% |
| Test Piece 38 | j | e | 0.2 | None | 0% | h | a | 10% |
| Test Piece 39 | j | None | 0 | None | 10% | h | a | 10% |
| Test Piece 40 | j | e | 0.2 | a | 10% | h | None | 0% |
| Test Piece 41 | j | e | 0.2 | None | 0% | h | None | 0% |
| Test Piece 42 | j | None | 0 | None | 0% | h | None | 0% |

TABLE 9-continued

| Cathode catalyst layer | A/(A + B) | High humidification, high load | Low humidification, low load | Deterioration rate (%) | Inner layer/outer layer two-layer structure | Aggregation phase, two-phase structure |
|---|---|---|---|---|---|---|
| Test Piece 34 | 0.7 | <0.3 V | 0.707 V | 11 | None (1 layer) | None |
| Test Piece 35 | 0.7 | <0.3 V | 0.734 V | 11 | Yes | None |
| Test Piece 36 | 0.7 | 0.589 V | 0.793 V | 11 | Yes | Yes |
| Test Piece 37 | 0.7 | 0.508 V | 0.677 V | 11 | Yes | Yes |
| Test Piece 38 | 0.7 | 0.481 V | 0.652 V | 11 | Yes | Yes |
| Test Piece 39 | 0.7 | 0.461 V | 0.627 V | 11 | Yes | Yes |
| Test Piece 40 | 0.7 | 0.404 V | 0.753 V | 11 | Yes | Yes |
| Test Piece 41 | 0.7 | 0.318 V | 0.722 V | 11 | Yes | Yes |
| Test Piece 42 | 0.7 | <0.3 V | 0.723 V | 11 | Yes | Yes |

First, among the catalyst layers prepared in the above comparison of performance, the catalyst layers of the Test Piece 36 which has the two-layer structure and has the two-phase aggregation phase, the Test Piece 34 which does not have either such a two-layer structure or two-phase aggregation structure, and the Test Piece 35 which has the two-layer structure, but does not have the two-phase aggregation structure were examined for cross-sectional structure.

For the observed samples, the MEAs used in the comparison of the performance were evaluated for performance, then were taken out from the cells and tweezers were used to carefully peel off the gas diffusion layers. Next, the MEAs from which the gas diffusion layers were peeled off were cut by a cutter knife into sizes of 5 mm square. Each piece was fixed by carbon tape to the holder of a cryomicrotome so that the catalyst layer of the cathode could be cut. The prepared holder was set in the cryomicrotome. For the knife, a diamond trimming knife was set. At this time, the diamond trimming knife was set at an angle of about 10 degrees with respect to the direction of advance of the knife so as to enable the catalyst layer to be cut at a slant. The cutting temperature was set to −90° C. The piece was cut in the depth direction of the catalyst layer by a thickness of 50 nm per cut for at least 100 cuts to prepare a cut cross-section of the catalyst layer. Each catalyst layer with such a prepared cut cross-section was set together with the holder in an electron microscope holder and examined by a secondary electron image and reflected electron image at a power of 10,000×.

First, from the secondary electron image, it could be judged that the catalyst layers of the Test Piece 36 and the Test Piece 35 clearly formed two-layer structures due to the difference in shapes of the composite carbon materials. As opposed to this, the Test Piece 34 could be confirmed to be comprised of a plurality of carbon material shapes, but it could be confirmed that these were uniformly dispersed and a single-layer structure was formed.

Further, the catalyst layers of the Test Piece 34 and Test Piece 35 were observed to have a uniformly bright contrast in the reflected electron image other than at locations where it is presumed from the secondary electron image that the electrolytic material forms masses. No aggregation phase of the carbon material where no catalyst ingredient is carried (gas-diffusing carbon material aggregation phase) could be seen. As opposed to this, at the catalyst layer of the Test Piece 36, in the locations where it can be judged that there is clearly a carbon material in the secondary electron image, locations with a dark contrast in the reflected electron image, that is, aggregation phases of the carbon material where no catalyst ingredient is carried (gas-diffusing carbon material aggregation phases), could be observed distributed in island shapes.

For more quantitative discrimination, a reflected electron image is obtained as electronic information by a power of 10,000×, a resolution of 272 DPI×272 DPI or more, and a luminance of 256 shades. The luminance of the obtained image is binarized using image analyzing software to display the range from dark to the 110th shade by black and the range from the 111th shade to bright to the 256th shade by white. Next, the black points are dilated once to confirm the adjoining points. Furthermore, fill-in processing is performed to fill in the blank parts in the range and make the range appear to be the same. Finally, contraction is performed to return the dilated parts and clarify the targeted range. After this, the circle equivalent diameter of each black part is calculated from the area of each black part and parts of less than 300 nm are all cut. If counting the number of black parts, among the remaining black parts, where there is a carbon material in the secondary electron image of the same field, there were eight. Furthermore, even if cutting the black parts with a circle equivalent diameter of 500 nm or less, if counting the number of black parts, among the remaining black parts, where there is a carbon material in the secondary election image of the same field, there were three. The outer layer was similarly analyzed, whereupon there were three parts with a circle equivalent diameter of 300 nm or more.

As shown in Table 9, if comparing the Test Pieces 34 to 36, the Test Piece 36 using a two-layer structure catalyst layer having an aggregation phase structure for both the inner layer and outer layer exhibited the best characteristics. The Test Piece 34 which used a catalyst layer which lacked an inner layer and outer layer and did not have an aggregation phase structure and the Test Piece 35 which used a catalyst layer which had an inner layer and outer layer, but in which these did not have an aggregation phase structure had low characteristics under both high humidification, high load conditions and low humidification, low load conditions compared with the Test Piece 36.

Further, if comparing the Test Piece 36 and the Test Pieces 37 to 42 using a two-layer structure catalyst layer having an aggregation phase structure for both the inner layer and outer layer, the Test Piece 36 in which the inner layer contained the catalyst-carrying carbon material A, conductivity aid carbon material, and gas-diffusing carbon material and the outer layer contained the catalyst-carrying carbon material B and gas-diffusing carbon material exhibited the best characteristics. Compared with Test Piece 36, the Test Pieces 37 to 42 missing at least one type of carbon material of the inner layer or outer layer exhibited lower characteristics than the Test Piece 36.

Example 7

Effect of Catalyst Carrier Carbon Material A at Inner Layer of Two-Phase Catalyst (Claim 6)

As shown in Table 10, using a two-layer structure catalyst layer selecting "a" to "k" of Table 3 for the catalyst-carrying carbon material A, "e" of Table 3 for the conductivity aid carbon material Y, and "a" of Table 3 for the gas-diffusing carbon material for the catalyst layer of the inner layer and selecting "h" of Table 3 for the catalyst-carrying carbon material B and "a" of Table 3 for the gas-diffusing carbon material for the catalyst layer of the outer layer, a comparison was made for different types of the catalyst-carrying carbon material A of the inner layer.

The catalyst layer was prepared by preparing inner layer-use coating ink and outer layer-use coating ink based on the above <Standard Method of Preparation of Coating Ink> and using these two types of coating ink for the method described in the <Method of Preparation of Catalyst Layer>. The prepared catalyst layer had an inner layer and outer layer each having an aggregation phase structure. The power generation performances when using such a catalyst layer as the cathode was compared. Note that, for the anode, the catalyst layer of the Test Piece 10 was used.

TABLE 10

| Cathode catalyst layer | Inner layer | | | | | Outer layer | | |
|---|---|---|---|---|---|---|---|---|
| | Catalyst-carrying carbon material A | Conductivity aid carbon material Y | Y/(A + Y) | Gas diffusing carbon material | Content of gas-diffusing carbon material | Gatalyst-carrying carbon material B | Gas-diffusing carbon material | Gas-diffusing carbon material |
| Comp. Piece 16 | a | e | 0.2 | a | 10% | h | a | 10% |
| Comp. Piece 17 | b | e | 0.2 | a | 10% | h | a | 10% |
| Comp. Piece 18 | c | e | 0.2 | a | 10% | h | a | 10% |
| Comp. Piece 19 | d | e | 0.2 | a | 10% | h | a | 10% |
| Comp. Piece 20 | e | e | 0.2 | a | 10% | h | a | 10% |
| Comp. Piece 21 | f | e | 0.2 | a | 10% | h | a | 10% |
| Comp. Piece 22 | g | e | 0.2 | a | 10% | h | a | 10% |
| Comp. Piece 23 | h | e | 0.2 | a | 10% | h | a | 10% |
| Comp. Piece 24 | i | e | 0.2 | a | 10% | h | a | 10% |
| Test Piece 36 | j | e | 0.2 | a | 10% | h | a | 10% |
| Test Piece 43 | k | e | 0.2 | a | 10% | h | a | 10% |

| Cathode catalyst layer | A/(A + B) | High humidification, high load | Low humidification, low load | Deterioration rate (%) | Inner layer/outer layer two-layer structure | Aggregation phase, two-phase structure |
|---|---|---|---|---|---|---|
| Comp. Piece 16 | 0.7 | 0.620 V | 0.619 V | 11 | Yes | Yes |
| Comp. Piece 17 | 0.7 | 0.599 V | 0.633 V | 12 | Yes | Yes |
| Comp. Piece 18 | 0.7 | 0.570 V | 0.611 V | 13 | Yes | Yes |
| Comp. Piece 19 | 0.7 | 0.574 V | 0.755 V | 15 | Yes | Yes |
| Comp. Piece 20 | 0.7 | 0.605 V | 0.638 V | 15 | Yes | Yes |
| Comp. Piece 21 | 0.7 | 0.587 V | 0.653 V | 14 | Yes | Yes |
| Comp. Piece 22 | 0.7 | 0.579 V | 0.625 V | 12 | Yes | Yes |
| Comp. Piece 23 | 0.7 | 0.626 V | 0.759 V | 13 | Yes | Yes |
| Comp. Piece 24 | 0.7 | 0.601 V | 0.806 V | 15 | Yes | Yes |
| Test Piece 36 | 0.7 | 0.589 V | 0.793 V | 10 | Yes | Yes |
| Test Piece 43 | 0.7 | 0.571 V | 0.790 V | 11 | Yes | Yes |

As shown in Table 10, the Test Pieces 36 to 43 which used the catalyst carbon materials "j" and "k" of the present invention for the catalyst-carrying carbon material A exhibited extremely superior performance in all of the high humidification, high load characteristic, low humidification, low load characteristic, and deterioration rate.

in the <Method of Preparation of Catalyst Layer>. The prepared catalyst layer had an inner layer and outer layer each having an aggregation phase structure. The power generation performances when using such a catalyst layer as the cathode was compared. Note that, for the anode, the catalyst layer of the Test Piece 10 was used.

TABLE 11

| Cathode catalyst layer | Inner layer | | | | | Outer layer | | |
|---|---|---|---|---|---|---|---|---|
| | Catalyst-carrying carbon material A | Conductivity aid carbon material Y | Y/(A + Y) | Gas diffusing carbon material | Content of gas-diffusing carbon material | Gatalyst-carrying carbon material B | Gas-diffusing carbon material | Gas-diffusing carbon material |
| Test Piece 44 | j | e | 0.2 | a | 10% | a | a | 10% |
| Test Piece 45 | j | e | 0.2 | a | 10% | b | a | 10% |
| Test Piece 46 | j | e | 0.2 | a | 10% | c | a | 10% |
| Test Piece 47 | j | e | 0.2 | a | 10% | d | a | 10% |
| Test Piece 48 | j | e | 0.2 | a | 10% | e | a | 10% |
| Test Piece 49 | j | e | 0.2 | a | 10% | f | a | 10% |
| Test Piece 50 | j | e | 0.2 | a | 10% | g | a | 10% |
| Test Piece 36 | j | e | 0.2 | a | 10% | h | a | 10% |
| Test Piece 51 | j | e | 0.2 | a | 10% | i | a | 10% |
| Test Piece 52 | j | e | 0.2 | a | 10% | j | a | 10% |

| Cathode catalyst layer | A/(A + B) | High humidification, high load | Low humidification, low load | Deterioration rate (%) | Inner layer/outer layer two-layer structure | Aggregation phase, two-phase structure |
|---|---|---|---|---|---|---|
| Test Piece 44 | 0.7 | 0.628 V | 0.796 V | 8 | Yes | Yes |
| Test Piece 45 | 0.7 | 0.596 V | 0.782 V | 9 | Yes | Yes |
| Test Piece 46 | 0.7 | 0.563 V | 0.778 V | 11 | Yes | Yes |
| Test Piece 47 | 0.7 | 0.331 V | 0.751 V | 11 | Yes | Yes |
| Test Piece 48 | 0.7 | 0.583 V | 0.798 V | 9 | Yes | Yes |
| Test Piece 49 | 0.7 | 0.340 V | 0.643 V | 11 | Yes | Yes |
| Test Piece 50 | 0.7 | 0.327 V | 0.687 V | 11 | Yes | Yes |
| Test Piece 36 | 0.7 | 0.589 V | 0.793 V | 8 | Yes | Yes |
| Test Piece 51 | 0.7 | 0.338 V | 0.789 V | 11 | Yes | Yes |
| Test Piece 52 | 0.7 | 0.429 V | 0.773 V | 10 | Yes | Yes |

As opposed to this, the Comparative Piece 16 to Comparative Piece 24 which used the carbon materials "a" to "i" not meeting the definition of the catalyst-carrying carbon material of the present invention for the catalyst-carrying carbon material A were poor in low humidification, low load characteristic and deterioration rate.

Example 8

Effect of Catalyst-Carrying Carbon Material B in Outer Layer of Two-Phase Catalyst (Claims 6 and 7)

As shown in Table 11, using a two-layer structure catalyst layer selecting "j" of Table 3 and Table 4 for the catalyst-carrying carbon material A, "e" of Table 3 for the conductivity aid carbon material Y, and "a" of Table 3 for the gas-diffusing carbon material for the catalyst layer of the inner layer and selecting "a" to "j" of Table 3 for the catalyst-carrying carbon material B and "a" of Table 3 for the gas-diffusing carbon material for the catalyst layer of the outer layer, a comparison was made for different types of the catalyst-carrying carbon material B of the outer layer.

The catalyst layer was prepared by preparing inner layer-use coating ink and outer layer-use coating ink based on the above <Standard Method of Preparation of Coating Ink> and using these two types of coating ink for the method described As shown in Table 11, the Test Piece 36, Test Pieces 44 to 46, and Test Piece 48 which use the catalyst-carrying carbon material "j" satisfying claims 1 and 2 for the catalyst-carrying carbon material A and which use the catalyst-carrying carbon materials "a", "b", "c", "e", and "h" satisfying claim 3 of the present invention for the catalyst-carrying carbon material B exhibited extremely superior performance in all of the high humidification, high load characteristic, low humidification, low load characteristic, and deterioration rate.

As opposed to this, in the Test Pieces 47, 49, and 50 to 52 using the carbon materials "d", "f", "g", "i", and "j" not satisfying the definition of the present invention for the catalyst-carrying carbon material B as the catalyst-carrying carbon material B, in particular the high humidification, high load characteristic were poor.

Example 9

Effect of Conductivity Aid Carbon Material in Inner Layer of Two-Phase Catalyst (Claims 6 and 7)

As shown in Table 12, using a two-layer structure catalyst layer selecting "j" of Table 3 and Table 4 for the catalyst-carrying carbon material A, "a" to "j" of Table 3 for the conductivity aid carbon material Y, and "a" of Table 3 for the gas-diffusing carbon material for the catalyst layer of the inner layer and selecting "h" of Table 3 for the catalyst-carrying carbon material B and "a" of Table 3 for the gas-diffusing carbon material for the catalyst layer of the outer layer, a comparison was made for different types of the conductivity aid carbon material Y of the inner layer. Further, a comparison was made when changing the mass ratio Y/(A+Y) of the conductivity aid carbon material Y to the catalyst-carrying carbon material A when the conductivity aid carbon material Y is "e" of Table 3.

The catalyst layer was prepared by preparing inner layer-use coating ink and outer layer-use coating ink based on the above <Standard Method of Preparation of Coating Ink> and using these two types of coating ink for the method described in the <Method of Preparation of Catalyst Layer>. The prepared catalyst layer had an inner layer and outer layer each having an aggregation phase structure. The power generation performances when using such a catalyst layer as the cathode were compared. Note that, for the anode, the catalyst layer of the Test Piece 10 was used.

carbon materials "a", "b", "c", "e", and "h" with a ratio $X/S_{BET}$ of the DBP oil absorption X ml/100 g and the specific surface area $S_{BET}$ evaluated by BET of 0.2 to 3.0 as the conductivity aid carbon material Y exhibited extremely superior performance in all of the high humidification, high load characteristic, low humidification, low load characteristic, and deterioration rate.

As opposed to this, Test Pieces 56, 63, 64, 66, and 67 using carbon materials "d", "f", "g", "i", and "j" with a ratio $X/S_{BET}$ of the DBP oil absorption X ml/100 g and the specific surface area $S_{BET}$ evaluated by BET outside the range of 0.2 to 3.0 as the conductivity aid carbon material Y exhibited $X/S_{BET}$ in the range of 0.2 to 3.0 under both high humidification, high load conditions and low humidification, low load conditions.

Further, if comparing the Test Pieces 36 and 57 to 62 with a type of the conductivity aid carbon material Y made the "e" of Table 3 and with a changed mass ratio Y/(A+Y) of the

TABLE 12

| Cathode catalyst layer | Inner layer | | | | | Outer layer | | |
| --- | --- | --- | --- | --- | --- | --- | --- | --- |
| | Catalyst-carrying carbon material A | Conductivity aid carbon material Y | Y/(A + Y) | Gas diffusing carbon material | Content of gas-diffusing carbon material | Gatalyst-carrying carbon material B | Gas-diffusing carbon material | Gas-diffusing carbon material |
| Test Piece 53 | j | a | 0.2 | a | 10% | h | a | 10% |
| Test Piece 54 | j | b | 0.2 | a | 10% | h | a | 10% |
| Test Piece 55 | j | c | 0.2 | a | 10% | h | a | 10% |
| Test Piece 56 | j | d | 0.2 | a | 10% | h | a | 10% |
| Test Piece 57 | j | e | 0.02 | a | 10% | h | a | 10% |
| Test Piece 58 | j | e | 0.05 | a | 10% | h | a | 10% |
| Test Piece 59 | j | e | 0.1 | a | 10% | h | a | 10% |
| Test Piece 36 | j | e | 0.2 | a | 10% | h | a | 10% |
| Test Piece 60 | j | e | 0.3 | a | 10% | h | a | 10% |
| Test Piece 61 | j | e | 0.4 | a | 10% | h | a | 10% |
| Test Piece 62 | j | e | 0.5 | a | 10% | h | a | 10% |
| Test Piece 63 | j | f | 0.2 | a | 10% | h | a | 10% |
| Test Piece 64 | j | g | 0.2 | a | 10% | h | a | 10% |
| Test Piece 65 | j | h | 0.2 | a | 10% | h | a | 10% |
| Test Piece 66 | j | i | 0.2 | a | 10% | h | a | 10% |
| Test Piece 67 | j | j | 0.2 | a | 10% | h | a | 10% |

| Cathode catalyst layer | A/(A + B) | High humidification, high load | Low humidification, low load | Deterioration rate (%) | Inner layer/outer layer two-layer structure | Aggregation phase, two-phase structure |
| --- | --- | --- | --- | --- | --- | --- |
| Test Piece 53 | 0.7 | 0.623 V | 0.784 V | 9 | Yes | Yes |
| Test Piece 54 | 0.7 | 0.613 V | 0.801 V | 9 | Yes | Yes |
| Test Piece 55 | 0.7 | 0.608 V | 0.773 V | 10 | Yes | Yes |
| Test Piece 56 | 0.7 | 0.543 V | 0.751 V | 10 | Yes | Yes |
| Test Piece 57 | 0.7 | 0.560 V | 0.758 V | 9 | Yes | Yes |
| Test Piece 58 | 0.7 | 0.586 V | 0.785 V | 9 | Yes | Yes |
| Test Piece 59 | 0.7 | 0.593 V | 0.794 V | 9 | Yes | Yes |
| Test Piece 36 | 0.7 | 0.589 V | 0.793 V | 9 | Yes | Yes |
| Test Piece 60 | 0.7 | 0.599 V | 0.763 V | 9 | Yes | Yes |
| Test Piece 61 | 0.7 | 0.591 V | 0.762 V | 9 | Yes | Yes |
| Test Piece 62 | 0.7 | 0.581 V | 0.683 V | 9 | Yes | Yes |
| Test Piece 63 | 0.7 | 0.538 V | 0.744 V | 10 | Yes | Yes |
| Test Piece 64 | 0.7 | 0.534 V | 0.736 V | 10 | Yes | Yes |
| Test Piece 65 | 0.7 | 0.581 V | 0.792 V | 9 | Yes | Yes |
| Test Piece 66 | 0.7 | 0.533 V | 0.758 V | 10 | Yes | Yes |
| Test Piece 67 | 0.7 | 0.552 V | 0.752 V | 9 | Yes | Yes |

If comparing the Test Pieces 53 to 56, 36, and 63 to 67 with a mass ratio Y/(A+Y) of the conductivity aid carbon material Y to the catalyst-carrying carbon material A fixed to 0.2 and with changed types of conductivity aid carbon material Y, the Test Pieces 53 to 55, Test Piece 36, and Test Piece 65 using the conductivity aid carbon material Y to the catalyst-carrying carbon material A, the Test Pieces 36 and 58 to 61 with a mass ratio Y/(A+Y) of 0.05 to 0.4 exhibited superior characteristics compared with the Test Pieces 57 and 62 with a mass ratio Y/(A+Y) of less than 0.05 or more than 0.4.

Example 10

Effect of Gas-Diffusing Carbon Material Included in Inner Layer and Outer Layer of Two-Phase Catalyst (Claims 6 and 7)

As shown in Table 13, using a two-layer structure catalyst layer selecting "j" of Table 3 and Table 4 for the catalyst-carrying carbon material A, "e" of Table 3 for the conductivity aid carbon material Y, and "a" of Table 3 for the gas-diffusing carbon material for the catalyst layer of the inner layer and selecting "h" of Table 3 for the catalyst-carrying carbon material B and "a" of Table 3 for the gas-diffusing carbon material for the catalyst layer of the outer layer, a comparison was made when changing the mass ratio A/(A+B) of the catalyst-carrying carbon material A and catalyst-carrying carbon material B included in the inner layer and outer layer. Further, a comparison was made when changing the contents of the gas-diffusing carbon material in the layers included in the inner layer and outer layer when the mass ratio A/(A+B) is 0.7.

The catalyst layer was prepared by preparing an inner layer-use coating ink and an outer layer-use coating ink based on the above <Standard Method of Preparation of Coating Ink> and using these two types of coating ink for the method described in the <Method of Preparation of Catalyst Layer>. The prepared catalyst layer had an inner layer and outer layer each having an aggregation phase structure. The power generation performances when using such a catalyst layer as the cathode was compared. Note that, for the anode, the catalyst layer of the Test Piece 10 was used.

TABLE 13

| Cathode catalyst layer | Inner layer | | | | | Outer layer | | |
| --- | --- | --- | --- | --- | --- | --- | --- | --- |
| | Catalyst-carrying carbon material A | Conductivity aid carbon material Y | Y/(A + Y) | Gas diffusing carbon material | Content of gas-diffusing carbon material | Gatalyst-carrying carbon material B | Gas-diffusing carbon material | Gas-diffusing carbon material |
| Test Piece 68 | j | e | 0.2 | a | 10% | h | a | 10% |
| Test Piece 69 | j | e | 0.2 | a | 10% | h | a | 10% |
| Test Piece 70 | j | e | 0.2 | a | 10% | h | a | 10% |
| Test Piece 71 | j | e | 0.2 | a | 10% | h | a | 10% |
| Test Piece 72 | j | e | 0.2 | a | 2% | h | a | 10% |
| Test Piece 73 | j | e | 0.2 | a | 5% | h | a | 10% |
| Test Piece 36 | j | e | 0.2 | a | 10% | h | a | 10% |
| Test Piece 74 | j | e | 0.2 | a | 20% | h | a | 10% |
| Test Piece 75 | j | e | 0.2 | a | 30% | h | a | 10% |
| Test Piece 76 | j | e | 0.2 | a | 40% | h | a | 10% |
| Test Piece 77 | j | e | 0.2 | a | 10% | h | a | 2% |
| Test Piece 78 | j | e | 0.2 | a | 10% | h | a | 5% |
| Test Piece 36 | j | e | 0.2 | a | 10% | h | a | 10% |
| Test Piece 79 | j | e | 0.2 | a | 10% | h | a | 20% |
| Test Piece 80 | j | e | 0.2 | a | 10% | h | a | 30% |
| Test Piece 81 | j | e | 0.2 | a | 10% | h | a | 40% |
| Test Piece 82 | j | e | 0.2 | a | 10% | h | a | 10% |
| Test Piece 83 | j | e | 0.2 | a | 10% | h | a | 10% |
| Test Piece 84 | j | e | 0.2 | a | 10% | h | a | 10% |

| Cathode catalyst layer | A/(A + B) | High humidification, high load | Low humidification, low load | Deterioration rate (%) | Inner layer/outer layer two-layer structure | Aggregation phase, two-phase structure |
| --- | --- | --- | --- | --- | --- | --- |
| Test Piece 68 | 0.1 | 0.632 V | 0.691 V | 9 | Yes | Yes |
| Test Piece 69 | 0.2 | 0.623 V | 0.753 V | 9 | Yes | Yes |
| Test Piece 70 | 0.35 | 0.617 V | 0.767 V | 9 | Yes | Yes |
| Test Piece 71 | 0.5 | 0.602 V | 0.788 V | 9 | Yes | Yes |
| Test Piece 72 | 0.7 | 0.523 V | 0.743 V | 9 | Yes | Yes |
| Test Piece 73 | 0.7 | 0.590 V | 0.808 V | 9 | Yes | Yes |
| Test Piece 36 | 0.7 | 0.589 V | 0.793 V | 9 | Yes | Yes |
| Test Piece 74 | 0.7 | 0.613 V | 0.789 V | 9 | Yes | Yes |
| Test Piece 75 | 0.7 | 0.564 V | 0.751 V | 9 | Yes | Yes |
| Test Piece 76 | 0.7 | 0.512 V | 0.720 V | 9 | Yes | Yes |
| Test Piece 77 | 0.7 | 0.513 V | 0.778 V | 9 | Yes | Yes |
| Test Piece 78 | 0.7 | 0.578 V | 0.791 V | 9 | Yes | Yes |
| Test Piece 36 | 0.7 | 0.589 V | 0.793 V | 9 | Yes | Yes |
| Test Piece 79 | 0.7 | 0.608 V | 0.798 V | 9 | Yes | Yes |
| Test Piece 80 | 0.7 | 0.605 V | 0.748 V | 9 | Yes | Yes |
| Test Piece 81 | 0.7 | 0.551 V | 0.691 V | 9 | Yes | Yes |
| Test Piece 82 | 0.85 | 0.585 V | 0.801 V | 9 | Yes | Yes |
| Test Piece 83 | 0.95 | 0.570 V | 0.808 V | 9 | Yes | Yes |
| Test Piece 84 | 0.98 | 0.521 V | 0.804 V | 9 | Yes | Yes |

If comparing the Test Pieces 68 to 71, 36, and 82 to 84 with a content of the gas-diffusing carbon material in the inner layer and outer layer of 10 mass %, the Test Pieces 69 to 71, 36, 82, and 83 with a mass ratio A/(A+B) of the catalyst-carrying carbon material A and catalyst-carrying carbon material B of 0.2 to 0.95 exhibited superior performance in all of the high humidification, high load characteristic, low humidification, low load characteristic, and deterioration rate compared with the Test Piece 68 with a mass ratio A/(A+B) of less than 0.2 and the Test Piece 84 with a mass ratio A/(A+B) of over 0.95. Further, if comparing the Test Pieces 36 and 72 to 76 with a mass ratio A/(A+B) of the catalyst-carrying carbon material A and catalyst-carrying carbon material B of 0.70 and with a changed content of the gas-diffusing carbon material of the inner layer, the Test Pieces 36 and 73 to 75 with a content of the gas-diffusing carbon material in the inner layer catalyst layer within the range of 3 mass % to 30 mass % exhibited superior performance in all of the high humidification, high load characteristic, low humidification, low load characteristic, and deterioration rate.

In particular, the Test Pieces 36, 73, and 74 with a content of the gas-diffusing carbon material in the inner layer catalyst layer in the range of 5 mass % to 25 mass % exhibited balanced, superior characteristics in the high humidification, high load characteristic, low humidification, low load characteristic, and deterioration rate. Further, if comparing the Test Pieces 36 and 77 to 81 with a mass ratio A/(A+B) of the catalyst-carrying carbon material A and catalyst-carrying carbon material B of 0.70 and with changed contents of the gas-diffusing carbon material of the outer layer, the Test Pieces 36 and 78 to 80 with a content of the gas-diffusing carbon material in the outer layer catalyst layer within the range of 3 mass % to 30 mass % exhibited superior performance in all of the high humidification, high load characteristic, low humidification, low load characteristic, and deterioration rate. In particular, the Test Pieces 36, 76, and 79 with a content of the gas-diffusing carbon material in the inner layer catalyst layer in the range of 5 mass % to 25 mass % exhibited balanced, superior characteristics in the high humidification, high load characteristic, low humidification, low load characteristic, and deterioration rate.

INDUSTRIAL APPLICABILITY

The present invention can be used for fuel cells for automobiles and for industrial or consumer use. The catalyst according to the present invention and a fuel cell using a catalyst layer including this catalyst as an electrode are high in resistance to oxidation loss of the catalyst carrier and other aspects of durability. Together with the effect of suppression of desorption of the catalyst metal ingredient from the carrier, it becomes possible to improve the durability of the catalyst itself under various environments.

REFERENCE SIGNS LIST 1 gas-diffusing carbon material aggregation phase
2 gas-diffusing carbon material
3 catalyst aggregation phase
4 catalyst-carrying carbon material A which carries a catalyst ingredient
5 catalyst-carrying carbon material B which carries a catalyst ingredient
6 electrolytic material
7 conductivity aid carbon material

The invention claimed is:

1. A catalyst for a solid polymer membrane fuel cell which is comprised of a carbon material which carries a catalyst ingredient which has an oxygen reducing activity, said catalyst characterized in that said carbon material has an amount of adsorption of water vapor ($V_{10}$) at 25° C. and a relative humidity of 10% of 2 ml/g or less and in that said carbon material has an amount of adsorption of water vapor ($V_{90}$) at 25° C. and a relative humidity of 90% of 400 ml/g or more to 2000 mL/g or less.

2. A catalyst for a solid polymer membrane fuel cell as set forth in claim 1, characterized in that said carbon material has a ratio $V_{10}/V_{90}$ of an amount of adsorption of water vapor ($V_{10}$) at 25° C. and a relative humidity of 10% and an amount of adsorption of water vapor ($V_{90}$) at 25° C. and a relative humidity of 90% of 0.002 or less.

3. An electrode for a solid polymer membrane fuel cell characterized by including the catalyst as set forth in claim 1.

4. A fuel cell which includes a pair of catalyst layers sandwiching a solid polymer proton conductive electrolytic membrane, said cell characterized in that at least the catalyst layer of the cathode includes a catalyst ingredient, electrolytic material, and carbon material
    said carbon material includes at least two types of carbon materials, wherein one is a catalyst-carrying carbon material which carries said catalyst ingredient and the other one is a gas-diffusing carbon material which does not carry said catalyst ingredient,
    and said catalyst-carrying carbon material includes at least two types of catalyst-carrying carbon materials which are catalyst-carrying carbon material A and catalyst-carrying carbon material B,
    said catalyst-carrying carbon material A is a solid polymer type fuel cell catalyst as set forth in claim 1, and
    said catalyst-carrying carbon material B has a ratio $X/S_{BET}$ of 0.2 to 3.0, wherein X is a dibutyl phthalate oil absorption in ml/100 g and $S_{BET}$ is a specific surface area evaluated by the BET method.

5. A fuel cell including a pair of catalyst layers sandwiching a solid polymer proton conductive electrolytic membrane, in which fuel cell at least the catalyst layer of the cathode includes a catalyst ingredient, electrolytic material, and carbon material,
    said carbon material includes at least two types of carbon materials, wherein one is a catalyst-carrying carbon material which carries said catalyst ingredient and the other one is a gas-diffusing carbon material which does not carry said catalyst ingredient,
    said catalyst-carrying carbon material includes at least two types of catalyst-carrying carbon material which are catalyst-carrying carbon material A and catalyst-carrying carbon material B,
    said catalyst-carrying carbon material A is a solid polymer type fuel cell catalyst as described in claim 1,
    said catalyst-carrying carbon material B has a ratio $X/S_{BET}$ of 0.2 to 3.0, wherein X is a dibutyl phthalate oil absorption ml/100 g and $S_{BET}$ is a specific surface area evaluated by the BET method, and
    said catalyst layer of the cathode is comprised of a two-phase mixed structure comprised of
    a catalyst aggregation phase comprised of ingredients comprised of said catalyst-carrying carbon material and said electrolytic material aggregated together and
    a gas-diffusing carbon material aggregation phase comprised of said gas-diffusing carbon material aggregated together.

6. A fuel cell including a pair of catalyst layers sandwiching a solid polymer proton conductive electrolytic membrane, in which fuel cell at least the catalyst layer of the cathode includes a catalyst ingredient, electrolytic material, and carbon material,
    said carbon material includes at least three types of carbon materials which are a catalyst-carrying carbon material which carries said catalyst ingredient, a conductivity aid carbon material which does not carry said catalyst ingredient, and a gas-diffusing carbon material which does not carry said catalyst ingredient, said catalyst-carrying carbon material includes at least two types of catalyst-carrying carbon material which are a catalyst-carrying carbon material A and catalyst-carrying carbon material B, said catalyst-carrying carbon material A is a solid polymer type fuel cell catalyst as set forth in claim 1, said catalyst-carrying carbon material B has a ratio $X/S_{BET}$ of 0.2 to 3.0, wherein X is a dibutyl phthalate oil absorption in ml/100 g and $S_{BET}$ is a specific surface area evaluated by BET of 0.2 to 3.0, and said catalyst layer of the cathode has a structure which contains at least two layers of an inner layer on a side contiguous with said proton conductive electrolytic membrane and an outer layer on a side not contiguous with said proton conductive electrolytic membrane, said inner layer is comprised of an at least two-phase mixed structure of a catalyst aggregation phase A comprised of ingredients comprised of said catalyst-carrying carbon material A, said conductivity aid carbon material, and said electrolytic material agglomerated together and a gas-diffusing carbon material aggregation phase comprised of at least ingredients comprised of said gas-diffusing carbon material agglomerated together, and said outer layer is comprised of an at least two-phase mixed structure of a catalyst aggregation phase B comprised of at least ingredients comprised of said catalyst-carrying carbon material B and said electrolytic material and a gas-diffusing carbon material aggregation phase comprised of at least ingredients comprised of said gas-diffusing carbon material agglomerated together, and said inner layer and said outer layer are structures wherein, in their layers, said catalyst aggregation phase A and said catalyst aggregation phase B are continuous and said gas-diffusing carbon material aggregation phase is dispersed in said catalyst aggregation phase A or B.

7. A fuel cell as set forth in claim 5 characterized in that said catalyst-carrying carbon material A further has a specific surface area $S_{BET}$ evaluated by BET of 1000 m²/g to 4000 m²/g and has a ratio $S_{micro}/S_{total}$ of 0.5 or more, wherein $S_{micro}$ is the micropore surface area of diameter 2 nm or less by t-plot analysis and $S_{total}$ is the total surface area.

8. A fuel cell as set forth in claim 4 characterized in that a mass ratio A/(A+B) of said catalyst-carrying carbon material A and said catalyst-carrying carbon material B in said catalyst layer is 0.2 to 0.95.

9. A fuel cell as set forth in claim 6 characterized in that a mass ratio Y/(A+Y) of said conductivity aid carbon material Y and said catalyst-carrying carbon material A in said inner layer is 0.05 to 0.4.

10. A fuel cell as set forth in claim 6 characterized in that said conductivity aid carbon material in said inner layer has a ratio $X/S_{BET}$ of 0.2 to 3.0, wherein X is dibutyl phthalate oil absorption in ml/100 g and $S_{BET}$ is a specific surface area evaluated by BET.

11. A fuel cell as set forth in claim 6 characterized in that a content of said gas-diffusing carbon material in said inner layer is 3 mass % to 30 mass %.

12. A fuel cell as set forth in claim 6, characterized in that a content of said gas-diffusing carbon material in said outer layer is 3 mass % to 30 mass %.

* * * * *

UNITED STATES PATENT AND TRADEMARK OFFICE
CERTIFICATE OF CORRECTION

| | | |
|---|---|---|
| PATENT NO. | : 8,999,606 B2 | Page 1 of 1 |
| APPLICATION NO. | : 12/998441 | |
| DATED | : April 7, 2015 | |
| INVENTOR(S) | : Takashi Iijima et al. | |

It is certified that error appears in the above-identified patent and that said Letters Patent is hereby corrected as shown below:

IN THE SPECIFICATION

Column 3, line 57, change "carrying hydrophobic, particles" to -- carrying hydrophobic particles --;

Column 4, line 6, change "PLT2: Japanese Patent Publication (A) No. 200.6-318707" to -- PLT2: Japanese Patent Publication (a) No. 2006-318707 --;

Column 12, line 28, change "relative humidity of 90% is 0.002 cr less," to -- relative humidity of 90% is 0.002 or less --;

Column 26, line 24, change "Methanol, ethanol" to -- methanol, ethanol --;

Column 26, line 34, change "toluene, benzene; ethyl acetate," to -- toluene, benzene, ethyl acetate, --;

Column 33, line 22, change "increased to 1000' mA/cm$^2$" to -- increased to 1000 mA/cm$^2$ --;

Column 41, lines 33-34, change "a Comparison was made." to -- a comparison was made. --;

Column 44, line 39, change "in the secondary election image" to -- in the secondary electron image --;

IN THE CLAIMS

Column 54, line 3, change "2000 mL/g or less." to -- 2000 ml/g or less. --; and

Column 55, lines 5-6, change "which are a catalyst-carrying carbon material" to -- which are catalyst-carrying carbon material --.

Signed and Sealed this
Twenty-third Day of February, 2016

Michelle K. Lee
*Director of the United States Patent and Trademark Office*